United States Patent
Chen et al.

(10) Patent No.: US 11,477,807 B2
(45) Date of Patent: Oct. 18, 2022

(54) ENHANCED SIGNAL DETECTION FOR WIRELESS COMMUNICATIONS

(71) Applicant: Intel Corporation, Santa Clara, CA (US)

(72) Inventors: Xiaogang Chen, Portland, OR (US); Robert Stacey, Portland, OR (US); Huaning Niu, San Jose, CA (US); Laurent Cariou, Portland, OR (US); Qinghua Li, San Ramon, CA (US); Feng Jiang, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/649,939

(22) PCT Filed: Dec. 29, 2017

(86) PCT No.: PCT/US2017/068954
§ 371 (c)(1),
(2) Date: Mar. 23, 2020

(87) PCT Pub. No.: WO2019/132980
PCT Pub. Date: Jul. 4, 2019

(65) Prior Publication Data
US 2021/0392660 A1   Dec. 16, 2021

(51) Int. Cl.
*H04W 72/12* (2009.01)
*H04L 5/00* (2006.01)
*H04W 72/04* (2009.01)

(52) U.S. Cl.
CPC ....... *H04W 72/1263* (2013.01); *H04L 5/0051* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 8,345,534 B1* | 1/2013 | Narasimhan | ......... | H04B 7/0447 370/208 |
| 10,218,822 B2* | 2/2019 | Zhang | ..................... | H04L 69/04 |
| 2005/0286474 A1* | 12/2005 | van Zelst | ............ | H04L 27/2613 370/334 |
| 2009/0092039 A1* | 4/2009 | Niu | ........................ | H04L 5/0044 370/208 |
| 2009/0323515 A1* | 12/2009 | Ishikura | .............. | H04L 27/2657 370/210 |

(Continued)

FOREIGN PATENT DOCUMENTS

WO   2016160528 A1   10/2016

OTHER PUBLICATIONS

International Search Report and Written Opinion for PCT Application No. PCT/US2017/068954, dated Sep. 21, 2018, 15 pages.

*Primary Examiner* — Andrew C Oh
(74) *Attorney, Agent, or Firm* — Eversheds Sutherland (US) LLP

(57) ABSTRACT

This disclosure describes systems, methods, and devices related to signal detection. A device may determine a physical layer protocol data unit (PPDU). The device may append a preamble to the PPDU. The device may generate a frame. The device may send the frame.

17 Claims, 11 Drawing Sheets

(56) References Cited

U.S. PATENT DOCUMENTS

| | | | |
|---|---|---|---|
| 2010/0254403 A1* | 10/2010 | Kash | H04L 49/55 370/445 |
| 2011/0305156 A1* | 12/2011 | Liu | H04L 47/50 370/252 |
| 2013/0121245 A1* | 5/2013 | Vermani | H04L 1/0039 370/328 |
| 2013/0128806 A1* | 5/2013 | Vermani | H04L 1/0033 370/328 |
| 2013/0142114 A1* | 6/2013 | Ault | H04L 1/187 370/328 |
| 2016/0021568 A1* | 1/2016 | Yu | H04B 7/0811 370/329 |
| 2016/0087765 A1 | 3/2016 | Guey et al. | |
| 2016/0087825 A1* | 3/2016 | Tian | H04W 72/0406 370/338 |
| 2016/0113034 A1* | 4/2016 | Seok | H04W 74/04 370/329 |
| 2016/0261452 A1 | 9/2016 | Porat et al. | |
| 2016/0295420 A1* | 10/2016 | Luo | H04L 27/2613 |
| 2016/0360443 A1* | 12/2016 | Hedayat | H04B 7/0452 |
| 2017/0134043 A1* | 5/2017 | Lee | H04L 1/0061 |
| 2017/0134540 A1* | 5/2017 | Yang | H04L 5/0053 |
| 2017/0188368 A1* | 6/2017 | Cariou | H04L 61/6022 |
| 2017/0202019 A1* | 7/2017 | You | H04W 74/0808 |
| 2017/0214561 A1* | 7/2017 | Lee | H04L 5/0007 |
| 2017/0257231 A1* | 9/2017 | Park | H04B 7/0413 |
| 2017/0272295 A1* | 9/2017 | Lee | H04L 5/00 |
| 2017/0279581 A1* | 9/2017 | Park | H04W 52/52 |
| 2018/0062805 A1* | 3/2018 | Huang | H04L 5/0023 |
| 2019/0053240 A1* | 2/2019 | Park | H04B 7/0413 |
| 2021/0185729 A1* | 6/2021 | Trainin | H04W 74/0816 |

\* cited by examiner

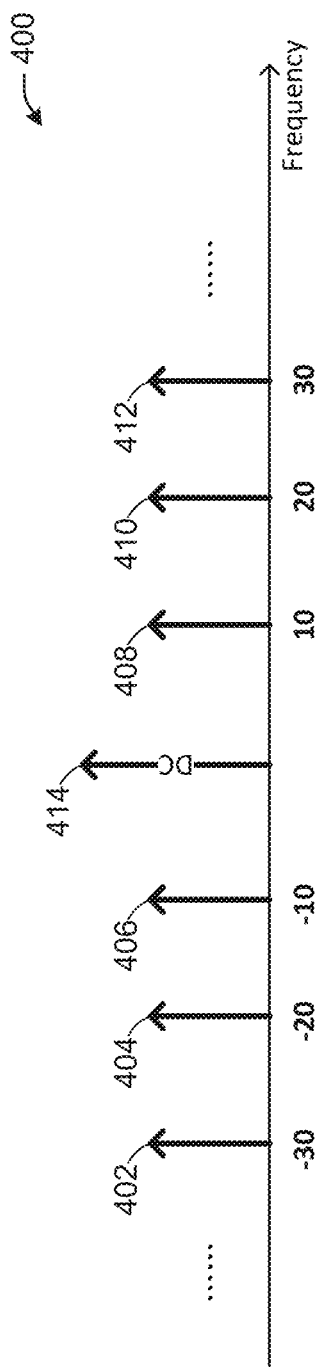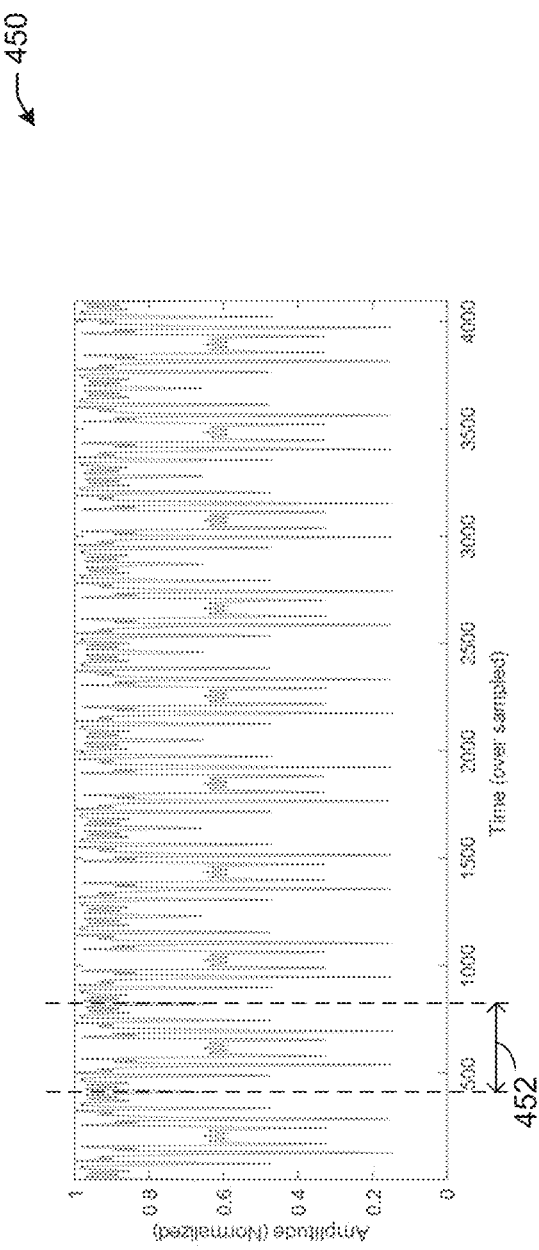
FIG. 4A
FIG. 4B
FIGs. 4A and 4B

ENHANCED SIGNAL DETECTION FOR WIRELESS COMMUNICATIONS

CROSS-REFERENCE TO RELATED APPLICATIONS

This application is a U.S. National Stage Application under 35 U.S.C. 371 and claims the priority benefit of PCT International Application No. PCT/US2017/068954, filed Dec. 29, 2017, the disclosure of which is incorporated herein by reference as if set forth in full.

TECHNICAL FIELD

This disclosure generally relates to systems and methods for wireless communications and, more particularly, to signal detection.

BACKGROUND

Wireless devices are becoming widely prevalent and are increasingly requesting access to wireless channels. The growing density of wireless deployments require increased network and spectrum availability. Wireless devices may communicate over a next generation 60 GHz (NG60) network, an enhanced directional multi-gigabit (EDMG) network, and/or any other network.

BRIEF DESCRIPTION OF THE DRAWINGS

FIG. 4A depicts an illustrative frequency mapping of a common pilot grid, in accordance with one or more example embodiments of the present disclosure.

FIG. 4B depicts an illustrative time domain signal, in accordance with one or more example embodiments of the present disclosure.

DETAILED DESCRIPTION

Figure 1:
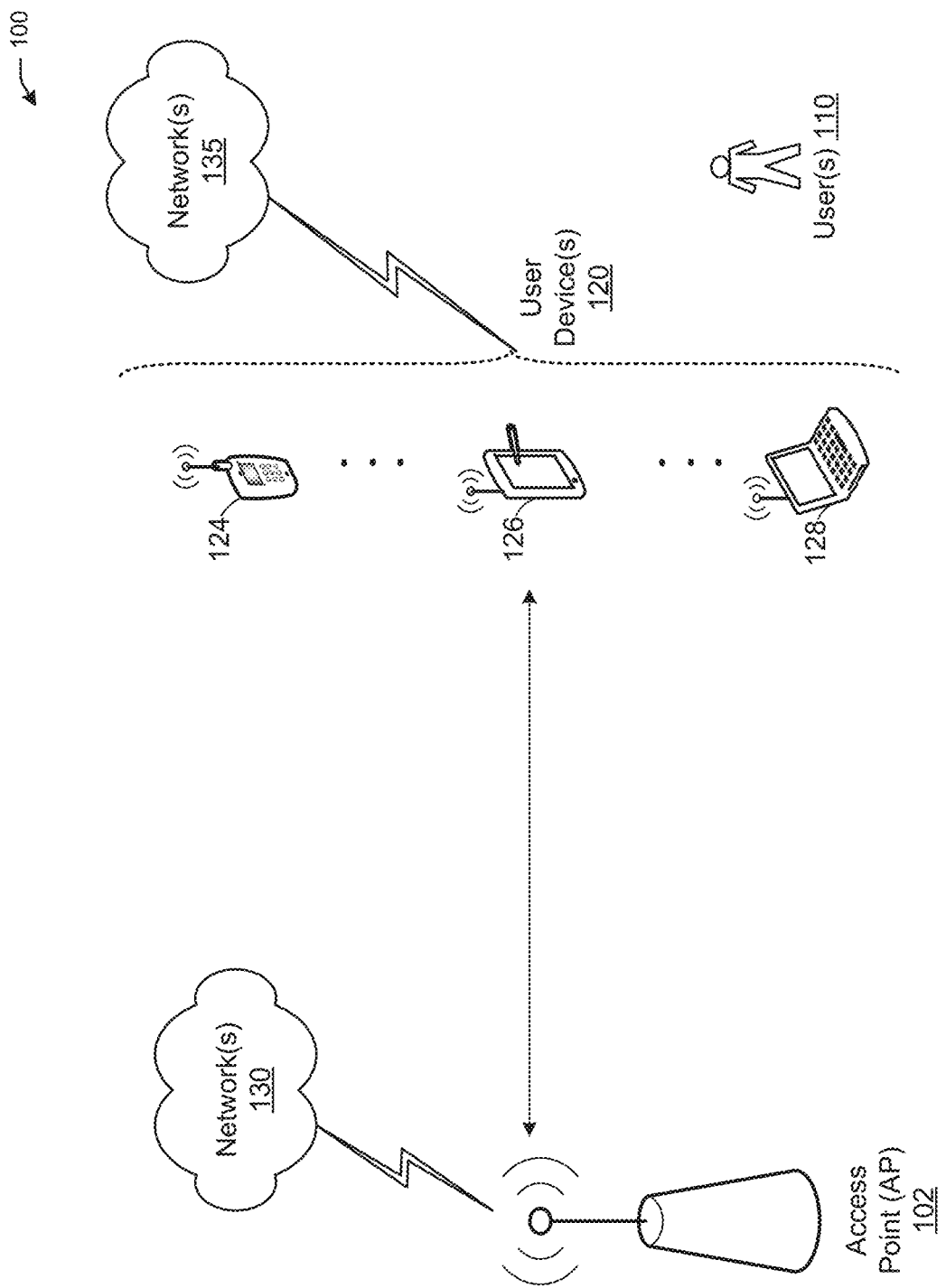
FIG. 1 depicts a network diagram illustrating an example network, in accordance with one or more example embodiments of the present disclosure.

Example embodiments described herein provide certain systems, methods, and devices for enhanced signal parameters for wireless communications. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Devices may communicate over a next generation 60 GHz (NG60) network, an enhanced directional multi-gigabit (EDMG) network, and/or any other network. Devices operating in EDMG may be referred to herein as EDMG devices. This may include user devices, and/or APs or other devices capable of communicating in accordance to a communication standard.

The IEEE 802.11 family of standards define methods of signal detection, such as carrier sensing. In wireless communications, carrier sensing refers to the ability of a device to detect a signal (e.g., a preamble of a signal). In some environments (e.g., licensed assisted access, Multefire™, etc.), energy detection may be used for carrier sensing. However, energy detection methods may lack information regarding a duration of concurrent transmissions, so devices using such methods may perform a random back off, and may repeat a clear channel assessment to determine if a channel is idle, for example. Efficiency of resource sharing of carrier sensing may be improved, however, as may signal detection accuracy. In particular, because energy detection methods rely on energy levels rather than a signal pattern, for example, false signal detections may occur because any energy level may trigger a determination that a signal is present.

Cyclic prefixes may also be used in signal detection. For example, cyclic prefix correlation has been used for clear channel assessment energy detection in non-primary channels to detect WiFi signals in the middle of a physical layer (PHY) protocol data unit (PPDU) in case of preamble detection failure. A symbol is a waveform, and each symbol may include a cyclic prefix which may allow a receiving device to detect and reconstruct the symbol. The cyclic prefix may be of a set length/duration. To simulate the infinite nature of a sinusoid, the cyclic prefix may be formed by copying an end portion of a symbol and reproducing/appending the end portion at the beginning of the symbol. A receiving device may receive the symbol and may compare the cyclic prefix to the end portion of the symbol in the time domain to determine whether the cyclic prefix matches the end portion to at least a predefined threshold level.

Signal detection may also depend on a preamble of the packet. However, different types of packets may use different preambles. A WiFi preamble may be different from a non-WiFi preamble. For example, a periodicity (e.g., a time domain signal periodicity) of a WiFi preamble may be different from that of a non-WiFi preamble. A periodicity may refer to a time domain signal periodicity during which one full cycle of a wave occurs. A full cycle of a wave may repeat over multiple intervals corresponding to the periodicity.

Because different types of devices may not recognize PPDUs because of their periodicity, some devices may not be able to detect certain types of packets and/or their lengths, which may be an issue in signal detection. For example, a non-WiFi device (e.g., an LTE device) may not be configured to identify and process WiFi packets. It may be desirable to use a common preamble that may be detected by different types of devices (e.g., both WiFi and non-WiFi devices). If a device does not recognize a packet or frame because, for example, the periodicity of a preamble is not recognized to be associated with a decodable frame, then the device may not be able to determine how long a PPDU may be, and therefore may not properly identify signals and/or properly adjust to a busy channel or band.

A WiFi PPDU may have one or more symbols, and may include a preamble with one or more fields/sub-fields. A WiFi preamble may have a set periodicity (e.g., 0.8 microseconds or 1.6 microseconds) so that a receiving device may recognize the PPDU as a WiFi PPDU. However, a device that is not configured to process a PPDU with a preamble periodicity corresponding to WiFi preamble periodicity may not be able to recognize the WiFi PPDU and make channel detection decisions.

Therefore, in channels with a variety of packet transmissions (e.g., an unlicensed 6 GHz band), a common preamble may be useful in allowing different types of devices to detect different types of traffic and determine PPDU types and lengths.

The IEEE 802.11 family standards also define subcarriers for orthogonal frequency division multiplexing (OFDM). A subcarrier (or tone) is a band of one or more frequencies that may be higher or lower than a carrier frequency. OFDM represents a multicarrier modulation scheme that allows for modulation of multiple subcarrier signals on multiple streams or channels. A resource unit (RU) may include a group of subcarriers as an allocation unit. There may be several types of subcarriers.

One subcarrier type may be a data subcarrier (e.g., data tone), which may be used for data transmission. Data subcarriers may be frequency channel dependent.

One subcarrier type may be a pilot subcarrier (e.g., pilot tone), which may be used for channel estimation and parameter tracking, such as carrier frequency offset and sampling frequency offset calculations. These calculations may be useful in making corrections at a device receiving the signal. Respective pilot subcarriers may be spaced by a constant step value, and therefore may have indexes referring to their location on a frequency spectrum. The frequency of a pilot tone may be used for determining a phase that may be used in demodulation of a signal, for example. Channel estimation using pilot subcarriers may allow for increased capacity of OFDM systems.

One subcarrier type may be an unused subcarrier that is not used for either data or pilot transmission. Unused subcarriers may include a direct current (DC) subcarrier (e.g., a DC=0 value), a Guard band subcarrier at band edges, and Null subcarriers. Null subcarriers may be located near a DC or edge tone to protect those tones near the DC or edge tones from interference of a neighboring resource unit (RU). Null subcarriers may have zero energy.

An RU having a number of tones (e.g., signal sounds) may consist of a number of data and pilot subcarriers. For example, a 26-tone RU may consist of 24 data subcarriers and two pilot subcarriers. A 52-tone RU may consist of 48 data subcarriers and four pilot subcarriers. Other sizes of RUs may have different numbers of data and pilot subcarriers as defined by the IEEE 802.11 family of standards. The pilot subcarrier positions of the RU may be fixed (e.g., as set in the IEEE 802.11ad standard), or may vary as described herein (e.g., may be frequency channel dependent).

The location of OFDM signal tones may be defined by a grid or structure in a frequency domain. In particular, pilot subcarriers (e.g., tones) may be set in fixed locations for a given frequency channel Pilot subcarriers may be used to identify signals. In some contexts, pilot subcarrier sequences across one or more spatial streams may not be contiguous because they may be orthogonal to one another (e.g., respective pilot tone sequences are at right angles to one another, meaning the dot product of two pilot tone sequences is zero). For example, pilots of 1 and −1 may be orthogonal to each other, meaning their phases are not contiguous. To simplify signal processing, however, the phases of pilot subcarriers may be contiguous. Thus, if a time domain signal is a continuous sinusoid function with a given frequency, a detector may more easily detect a signal by determining if there are sinusoidal waves for each frequency used.

The Federal Communications Commission (FCC) may open more unlicensed bands (e.g., from 5925 MHz to 7225 MHz for a Radio Local Area Network). In an unlicensed band, non-WiFi systems also may access the band and share resources with WiFi devices. Therefore, it may be desirable for different systems to be aware of the existence of each other. Thus, enhanced signal detection may be particularly useful in new unlicensed frequency bands (e.g., a 6 GHz band), and may also be useful in existing/licensed bands. For example, both WiFi and non-WiFi (e.g., Long-Term Evolution) transmissions may coexist in a frequency band, and some devices may not be able to detect signals properly if relying on energy detection or if not configured to recognize different types and lengths of signals. Therefore, it may be desirable to enhance signal detection with cyclic prefix correlation, a common preamble, and/or enhanced pilot subcarriers.

Example embodiments of the present disclosure relate to systems, methods, and devices for enhanced signal detection for wireless communications.

In one or more embodiments, for design simplification and backward compatibility, a common preamble may use structures similar to existing field structures (e.g., a common short training field structure). To map the common preamble to pilot subcarriers of a spectrum, a common sequence may be mapped to the spectrum based on a bandwidth and a step value (e.g., a value representing the distance between respective subcarriers).

In one or more embodiments, signal detection efficiency of resource sharing may be improved over energy detection, as may signal detection accuracy. In particular, false signal detections may be reduced from energy detection methods by using enhanced signal detection methods.

In one or more embodiments, a cyclic prefix may be formed by copying an end portion of a symbol and reproducing it at the beginning of the symbol. A receiving device may receive the symbol and may compare the cyclic prefix to the end portion of the symbol in the time domain to determine whether the cyclic prefix matches the end portion to at least a predefined threshold level. The cyclic prefix duration may vary, and the portion of a symbol to use in a cyclic prefix may correspond to the cyclic prefix duration.

In one or more embodiments, a common preamble may be useful in allowing different types of devices to detect different types of traffic. For design simplification and backward compatibility, a common preamble may use structures similar to existing field structures (e.g., a common short training field structure). The structure may refer to a number of symbols, a number of subcarriers, or length. To map the common preamble to pilot subcarriers of a spectrum, a common sequence may be mapped to the spectrum based on a bandwidth and a step value (e.g., a value representing the distance between respective subcarriers).

In one or more embodiments, the phase of pilot subcarriers may be contiguous in a time domain. To simplify signal processing, however, the phases of pilot subcarriers may be contiguous. Thus, if a time domain signal is a continuous sinusoid function with a given frequency, a detector may easily detect a signal by determining if there are sinusoidal waves for each frequency used. A transmitter may compensate a phase of each pilot subcarrier to ensure phase continuity between symbols, and null subcarriers that may otherwise have zero energy may be populated with energy by a transmitter to allow for a detecting device to detect sinusoidal functions on both pilot subcarriers and null subcarriers to identify a WiFi signal.

In one or more embodiments, enhanced signal detection may aid different radio access technologies to detect each other's transmissions more accurately and efficiently. For example, if a PPDU length is known by a device, devices may be able to implement power saving modes.

In one or more embodiments, enhanced pilot subcarriers may be all ones and may be contiguous.

In one or more embodiments, a cyclic prefix may be used in OFDM modulation. The cyclic prefix may be a copy of an end portion of an OFDM symbol. A detecting device may correlate the cyclic prefix with the end portion of the OFDM symbol in the time domain to determine whether the correlation at least exceeds a threshold value.

Enhanced signal detection with cyclic prefix correlation detection may be advantageous in some contexts (e.g., a 6 GHz band) because, for example, devices without such capability (e.g., licensed assisted access devices) may only need to perform time domain processing.

In one or more embodiments, the cyclic prefix duration/size may vary. For example, the cyclic prefix may be 0.8 microseconds, 1.6 microseconds, 3.2 microseconds, or another value. The larger the cyclic prefix duration, the more computational complexity may be required. However, by correlating the copied portion of a symbol (e.g., reproduced at the beginning of a symbol) with the portion of the symbol (e.g., at the end of the symbol), signal detection may be enhanced and simplified.

In one or more embodiments, cyclic prefix correlation may not be limited to a data portion of a PPDU. For example, enhanced signal detection with cyclic prefix correlation detection may be applied to a preamble portion of a frame. For example, cyclic prefix correlation detection may be applied to short training fields, long training fields, and signal fields of a frame preamble. One difference, however, may be that OFDM symbol duration in a preamble may be that the preamble duration may not be the same as the data symbol duration (e.g., a data symbol duration of 12.8 microseconds). A parallel detection thread with a different correlation window size may be used for cyclic prefix correlation in a preamble portion.

Pilot tones may be inserted in a WiFi data symbol for phase tracking. The time domain signal on a pilot tone may be $p^f_1 = a_1 \sin(w_1 + \varphi_1) * s_t$, wherein a is the amplitude, w may be the frequency for the pilot tone, $\varphi$ may be the initial phase for the pilot tone, and $s_t$ may be 1 or −1 (e.g., representing a sequence change between different symbols). A time domain signal may be a continuous sinusoidal function with a respective frequency (e.g., $w_1$ may be a first frequency, $w_2$ may be a second frequency, and so on). Thus, a device may detect a signal by identifying sinusoid waves with values corresponding to the respective frequencies. A device may use an auto-correlation or cross-correlation to verify the sinusoid waves.

In one or more embodiments, the time domain sequence $s_t$ may be replaced with $s_{t,w}$, which may be used to generate a continuous phase sinusoid waveform between OFDM symbols. For example, a transmitter may compensate the phase $\varphi$ for each pilot to ensure phase continuity between different OFDM symbols. For example, compensation may include multiplying the phase by a value.

Null subcarriers may also be included, and may have zero energy. In one or more embodiments, null subcarriers may be used in a manner similar to pilot tones to facilitate enhanced signal detection. For example, a transmitter may provide energy on null subcarriers and may map binary phase shift keying modulated signals multiplied by $s_{t,w}$ in the null subcarriers. Thus, more energy may be transmitted by using null subcarriers in this manner A device may detect a sinusoid function using both pilot and null subcarriers to identify a WiFi signal, for example.

In one or more embodiments, to enable bilateral detection between WiFi and non-WiFi systems, a common preamble may be used. The common preamble may be detectable by different types of systems, and may be detectable in a time domain within a reasonable time. The common preamble may not cause a false identification of a packet. The common preamble may have a low peak-to-average power ratio (PAPR), and the common preamble may be able to indicate a PPDU length in the time domain.

In one or more embodiments, the common preamble may be detectable by both WiFi and non-WiFi devices. For example, a WiFi PPDU with the common preamble appended may be detectable by a non-WiFi device. Because a WiFi PPDU may not be decoded by a non-WiFi device, even if a non-WiFi device identifies a WiFi PPDU, the non-WiFi device may not be aware of the PPDU length, which may be useful to know in channel/signal detection. The common preamble may, however, may allow a non-WiFi device to identify a PPDU length even if the PPDU is a WiFi PPDU. For example, the common preamble may have a short training field that may be used for packet detection, and a length field that indicates the length of the PPDU so that a non-WiFi device may at least be aware of the length of the WiFi PPDU.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment, in accordance with one or more example embodiments of the present disclosure. Wireless network 100 may include one or more user device(s) 120 and one or more access point(s) (AP) 102, which may communicate in accordance with IEEE 802.11 communication standards, such as the IEEE 802.11ad and/or IEEE 802.11ay specifications. The user device(s) 120 may be referred to as stations (STAs). The user device(s) 120 may be mobile devices that are non-stationary and do not have fixed locations. Although the AP 102 is shown to be communicating on multiple antennas with user devices 120, it should be understood that this is only for illustrative purposes and that any user device 120 may also communicate using multiple antennas with other user devices 120 and/or AP 102.

Figure 7:
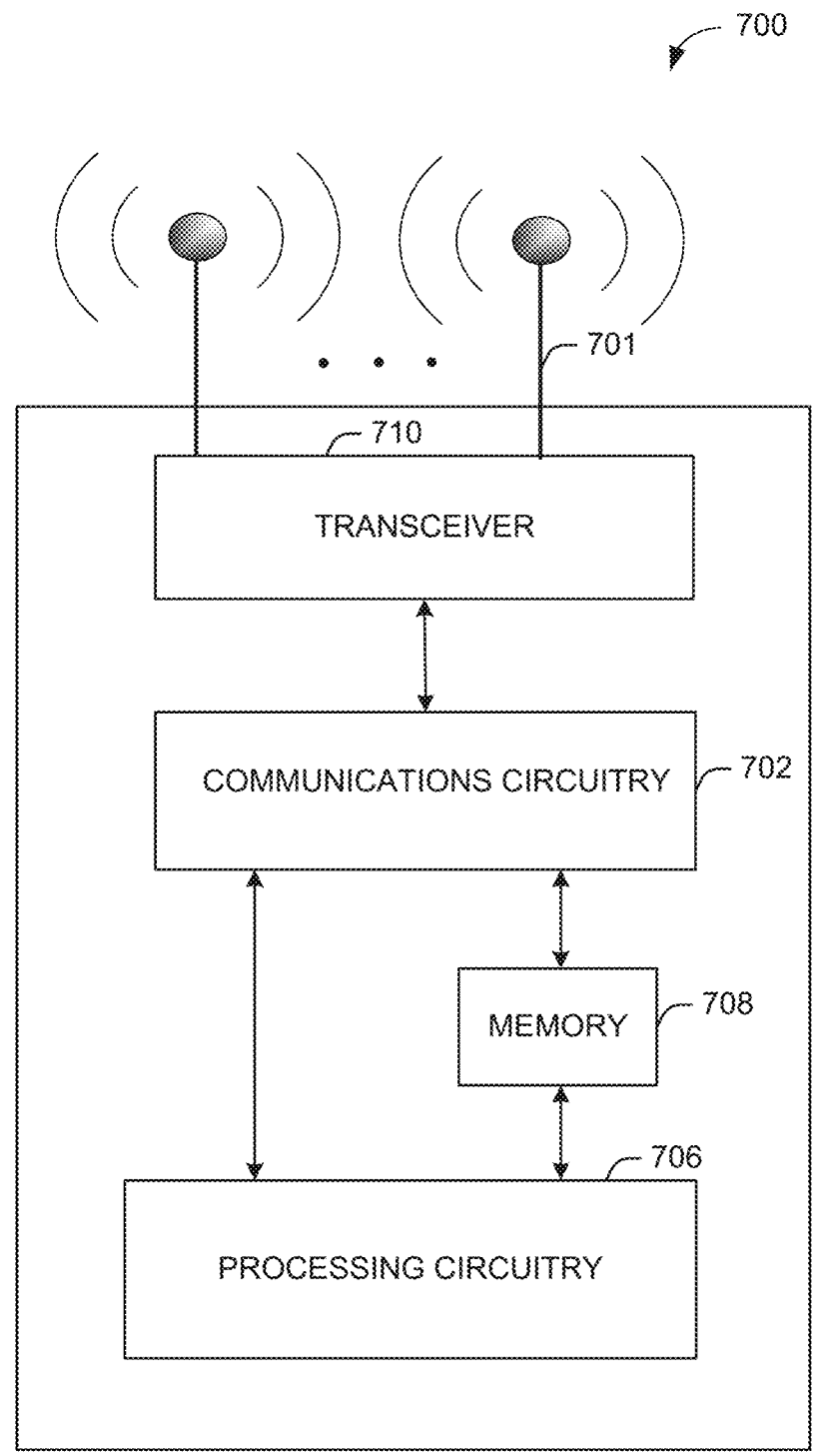
FIG. 7 illustrates a functional diagram of an example communication station that may be suitable for use as a user device, in accordance with one or more example embodiments of the present disclosure.
Figure 8:
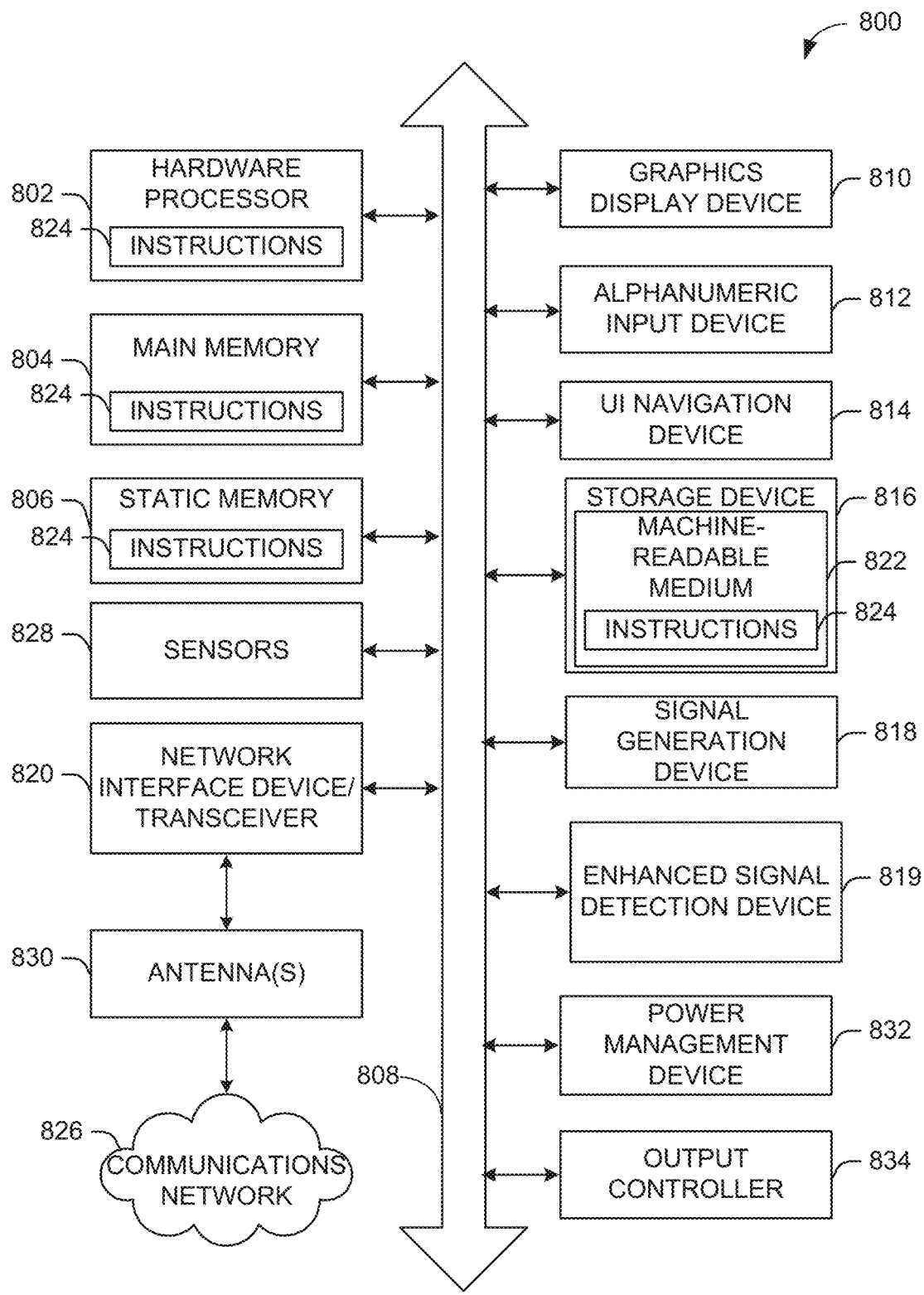
FIG. 8 is a block diagram of an example machine upon which any of one or more techniques (e.g., methods) may be performed, in accordance with one or more example embodiments of the present disclosure.

In some embodiments, the user device(s) 120 and the AP 102 may include one or more computer systems similar to that of the functional diagram of FIG. 7 and/or the example machine/system of FIG. 8.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The one or more communications antennas may be communicatively coupled to a radio component to transmit and/or receive signals, such as communications signals to and/or from the user devices 120 and/or AP 102.

Any of the user devices 120 (e.g., user devices 124, 126, 128), and AP 102 may include multiple antennas that may include one or more directional antennas. The one or more directional antennas may be steered to a plurality of beam directions. For example, at least one antenna of a user device 120 (or an AP 102) may be steered to a plurality of beam directions. For example, a user device 120 (or an AP 102) may transmit a directional transmission to another user device 120 (or another AP 102).

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some demonstrative embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

The phrases "directional multi-gigabit (DMG)" and "directional band (DBand)", as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

In some demonstrative embodiments, the user device(s) 120 and/or the AP 102 may be configured to operate in accordance with one or more specifications, including one or more IEEE 802.11 specifications, (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project.

It is understood that a basic service set (BSS) provides the basic building block of an 802.11 wireless LAN. For example, in infrastructure mode, a single access point (AP) together with all associated stations (STAs) is called a BSS.

It is understood that the above descriptions are for purposes of illustration and are not meant to be limiting.

Figure 2:
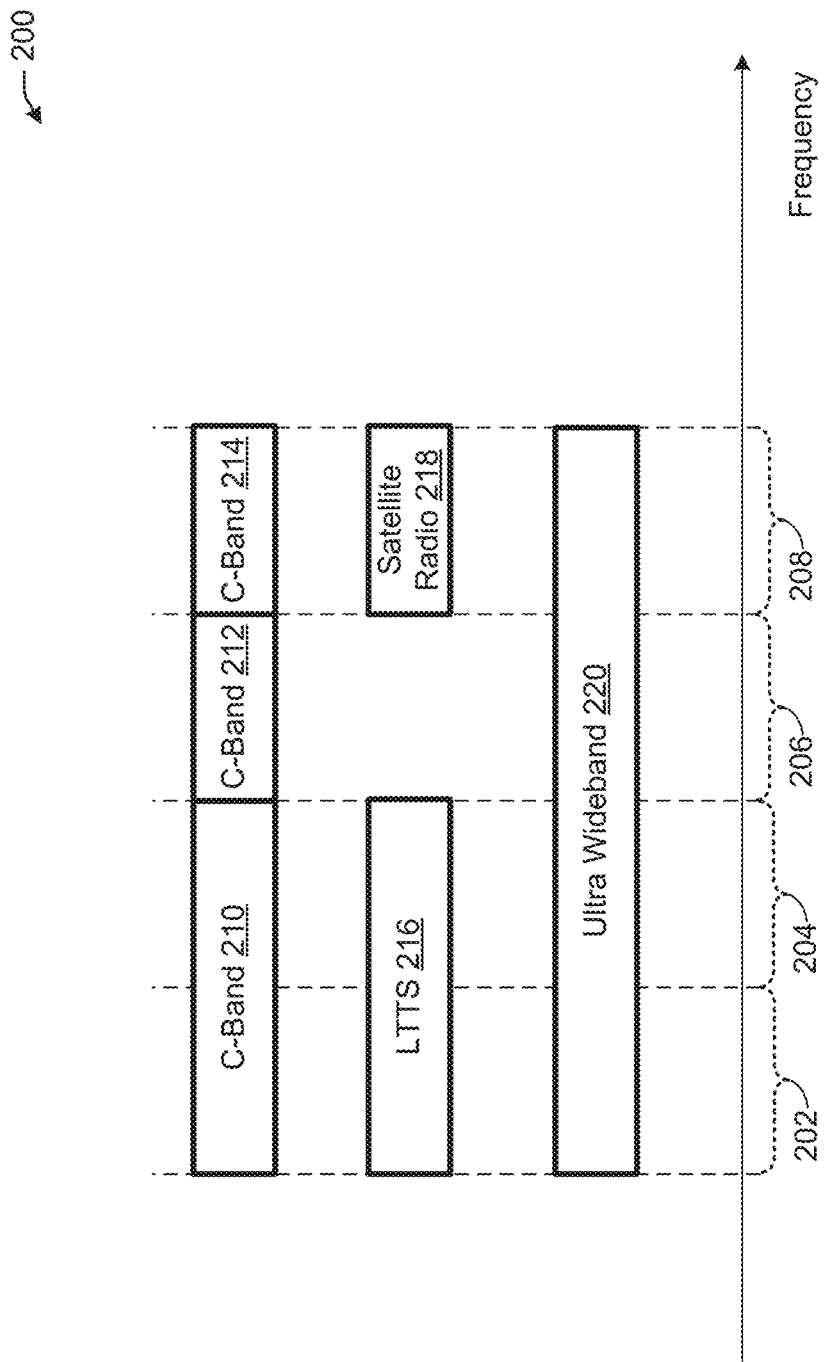
FIG. 2 depicts an illustrative 6 GHz band, in accordance with one or more example embodiments of the present disclosure.

FIG. 2 depicts an illustrative 6 GHz band 200, in accordance with one or more example embodiments of the present disclosure.

Referring to FIG. 2, the 6 GHz band 200 may span from 5935 MHz to 7225 MHz, and may include one or more sub-bands (e.g., sub-band 202, sub-band 204, sub-band 206, sub-band 208). Multiple bands/sub-bands may be licensed and/or unlicensed in the 6 GHz band 200. For example, C-Band 210, C-Band 212, C-Band 214, Local Television Transmission Service (LLTS) 216, Satellite Radio 218, and Ultra Wideband 220 may be examples of licensed channels within the 6 GHz band 200, and may span one or more sub-bands within the 6 GHz band 200.

More unlicensed bands from 5925 MHz to 7225 MHz for RLAN may be made available. Because the bands may be unlicensed, other wireless systems, (e.g. license assisted access) may also access the 6 GHz band 200 and share resources with WiFi devices. It may therefore be desirable to facilitate signal detection among multiple types of devices in the unlicensed bands of the 6 GHz band 200.

Figure 3A:
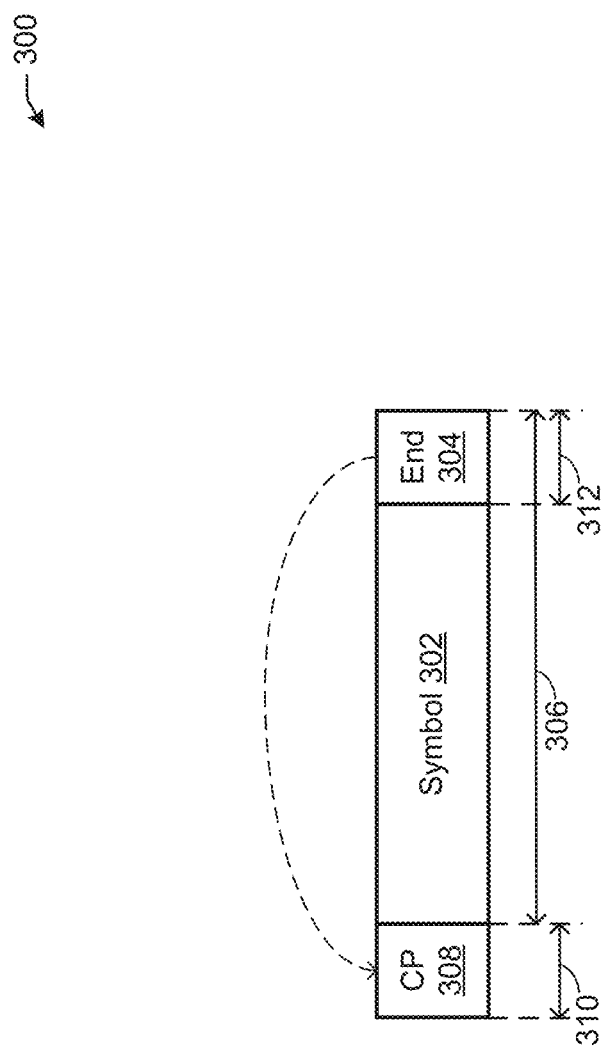
FIG. 3A depicts an illustrative cyclic prefix correlation, in accordance with one or more example embodiments of the present disclosure.

FIG. 3A depicts an illustrative cyclic prefix correlation 300, in accordance with one or more example embodiments of the present disclosure.

Referring to FIG. 3A, the cyclic prefix correlation 300 may depend on an OFDM symbol 302 in a time domain. The OFDM symbol 302 may include an end portion 304. The OFDM symbol 302, including end portion 304, may span a symbol duration 306 in the time domain. To implement the cyclic prefix correlation 300, the end portion 304 may be copied and appended at the front of the OFDM symbol 302. The appended portion may represent a cyclic prefix 308, which should be the same as the end portion 304, allowing a receiving device (e.g., user device 120 of FIG. 1) to match the cyclic prefix 308 to the end portion 304 (e.g., to determine that the cyclic prefix 308 and end portion 304 have the same information/content). Because the end portion 304 and the cyclic prefix 308 should be the same (e.g., should include the same information/content), the cyclic prefix 308 should have a time duration 310 that is the same as a time duration 312 of the end portion 304.

Legacy cyclic prefix correlation has been used for clear channel assessment using energy detection in non-primary channels to detect WiFi signals in a PPDU, for example, when preamble detection fails. If a PPDU preamble is not properly detected, legacy cyclic prefix correlation may be used.

In one or more embodiments, cyclic prefix correlation 300 may correlate the cyclic prefix 308 and the end portion 304 to determine if there is a match at least to a predetermined threshold. Non-WiFi devices (e.g., licensed assisted access devices) may only need to perform time domain processing when cyclic prefix correlation 300 is implemented, so non-WiFi devices may improve signal detection.

In one or more embodiments, time duration 310 may be varied. For example, time duration 310 may be 0.8 microseconds, 1.6 microseconds, or 3.2 microseconds. The longer time duration 310 is, the more computational complexity may be required for cyclic prefix correlation 300.

In one or more embodiments, OFDM symbol 302 may be part of a data portion of a PPDU, or may be part of another portion of a frame (e.g., a short training field, a signature field). Symbol duration 306 may be 12.8 microseconds for a data symbol, for example, but may be a different duration if OFDM symbol 302 is associated with a different part of a frame.

It is understood that the above descriptions are for purposes of illustration and are not meant to be limiting.

Figure 3B:
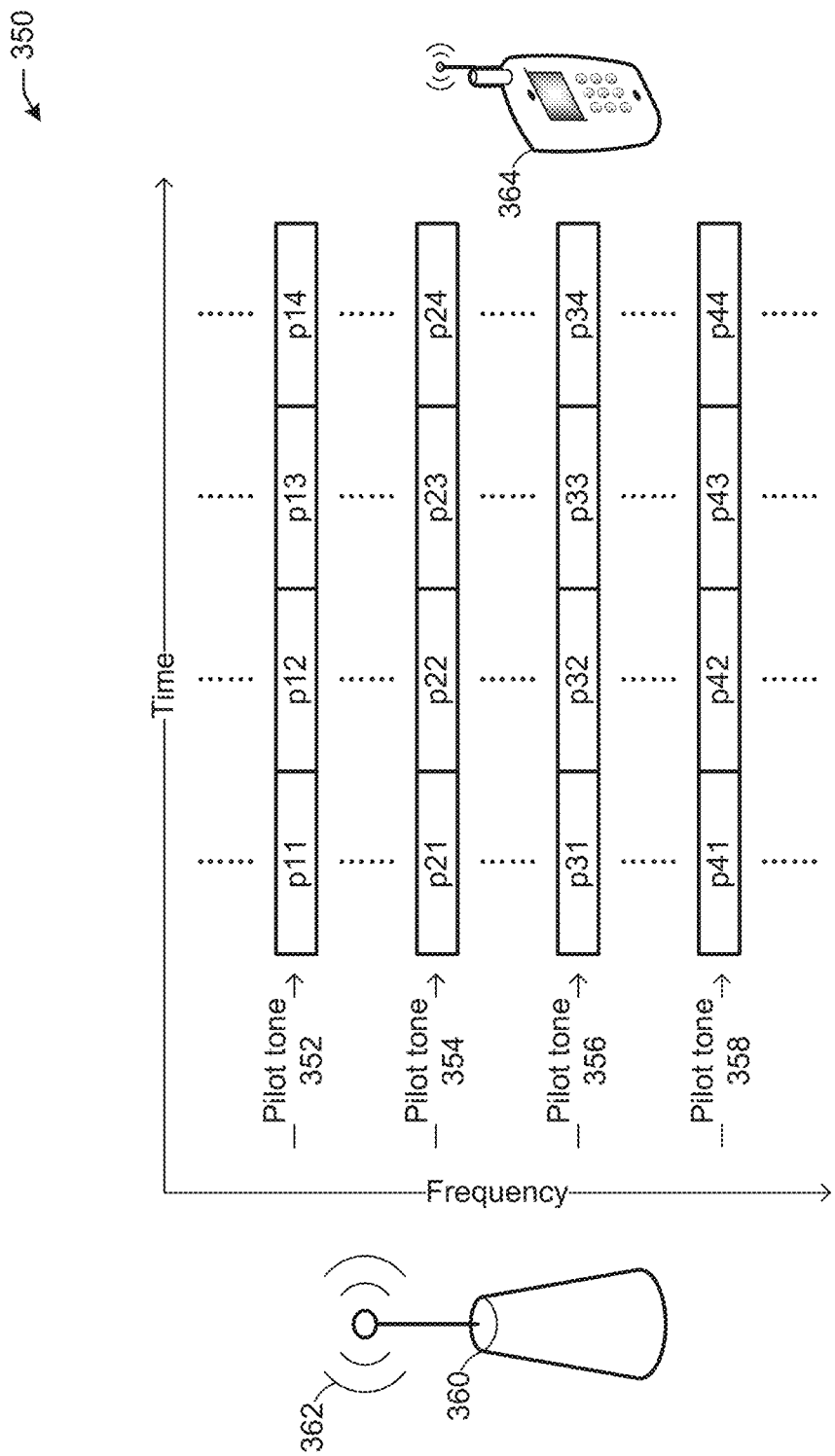
FIG. 3B depicts a pilot subcarrier structure, in accordance with one or more example embodiments of the present disclosure.

FIG. 3B depicts a pilot subcarrier structure 350, in accordance with one or more example embodiments of the present disclosure.

Referring to FIG. 3B, the pilot subcarrier structure 350 may be associated with one or more pilot tones (e.g., pilot tone 352, pilot tone 354, pilot tone 356, pilot tone 358). The pilot tones may be applied across both time and frequency. For example, pilot tone 352 may be a pilot tone in a first frequency, and may include OFDM symbols (e.g., p11, p12, p13, p14) across the time domain Pilot tone 354 may be a pilot tone in a second frequency, and may include OFDM symbols (e.g., p21, p22, p23, p24) across the time domain. Pilot tone 356 may be a pilot tone in a third frequency, and may include OFDM symbols (e.g., p31, p32, p33, p34) across the time domain. Pilot tone 358 may be a pilot tone in a fourth frequency, and may include OFDM symbols (e.g., p41, p42, p43, p44) across the time domain. Additional pilot tones may be applied in other frequencies. The symbols may alternate between positive and negative polarities (e.g., p11, −p12, p13, −p14 of pilot tone 352) based on sequence changes between the symbols. AP 360 may have a transmitter 362, which may send the pilot tones. A detecting device (e.g., device 364) may identify and detect the pilot tones.

Pilot tones (e.g., pilot tone 352, pilot tone 354, pilot tone 356, pilot tone 358) may be inserted into a WiFi data symbol for phase tracking, frequency offset measurements, and other calculations. In legacy applications, pilot tones may be multiplied by a polarity of 1 or −1, meaning their phase may not be contiguous (e.g., the 1 and −1 may refer to a change in polarity). The time domain signal on pilot tone 352 may be represented by $p^t_1 = a_1 \sin(w_1 + \varphi_1) * s_t$, where a is the amplitude of the wave, w is the frequency, φ is the initial phase for pilot tone 352, and $s_t = 1$ or −1, and represents sequence changes between different symbols across a time domain. However, multiplying the sinusoid by $s_t = 1$ or −1 may result in a non-contiguous phase across the symbols of a pilot tone. $s_t$ may alternate between 1 and −1 for every symbol of a pilot tone. Because of the alternating value of $s_t$, the symbols of a pilot tone may alternate in polarity. For example, p11 may be p11, p12 may be −p12, p13 may be p13, and p14 may be −p14. Because of the polarity change, phase continuity may not be guaranteed. For example, because of the alternating values of $s_t$, a phase of one symbol duration (e.g., a continuous sinusoid) may not be continuous with another symbol duration (e.g., the next symbol duration may be flipped so that the combination of the two symbol durations results in phase discontinuity). If p11 were represented by a waveform, and p12 were represented by the same waveform, then p11 and p12 combined should result in a continuous waveform in which the first waveform is repeated. However, because $s_t$ alternates between 1 and −1, the result may be p11 and −p12, meaning the waveform for p12 is flipped so that the opposite waveform of p11 may be represented by −p12 (e.g., phase discontinuity). In addition, in the IEEE 802.11ax standard, only single stream pilots may be used.

Having a contiguous phase for pilot tones across multiple symbols (e.g., p11, p12, p13, p14) may allow for enhanced signal detection in environments with one or more streams. For example, pilot tones of all 1s may be contiguous in phase, allowing for enhanced signal detection. To create a contiguous phase, symbols of a pilot tone (e.g., p11, p12, p13, p14 of pilot tone 352) may be multiplied by a value that accounts for time and frequency. If pilot tone 352 had symbols p11, p12, p13, and p14, and if the symbols were multiplied by $s_t$, the phases of p12 and p14 may be −p12 and −p14, and may not be contiguous with the phases of p11 and p13.

In one or more embodiments, if a time domain signal is represented by a continuous sinusoid function with frequency w (and the same analysis may apply to various w values), a detecting device (e.g., device 364) may detect a signal by determining if there are sinusoid waves with a corresponding frequency (e.g., w1, w2, and so forth). A detecting device may use auto correlation or cross-correlation to verify sinusoid waveforms. For example, pilot tone 352 may have frequency w1 across a time domain, so p11 may correspond to a symbol at t1 and w1, −p12 may correspond to a symbol at t2 and w1, p13 may correspond to a symbol at t3 and w1, and −p14 may correspond to a symbol at t4 and w1. To create phase continuity among OFDM symbols of a pilot tone, the time domain sequence $s_t = 1$ or −1 may be replaced by $s_{t,w}$, which may be a sequence across time and frequency, and which may be used to generate a continuous phase sinusoid waveform between different OFDM symbols (e.g., the waveform of p11 and p12 combined may be continuous, representing a repetition of the same waveform twice rather than one waveform followed by an opposite version of that waveform). A transmitter of a device (e.g., transmitter 362 of AP 360) may compensate the phase φ for each pilot tone to ensure phase continuity between different OFDM symbols (e.g., the transmitter may maintain $s_{t,w}$). The value of $s_{t,w}$ may be any value that maintains phase continuity of the symbols across the time domain, and may depend on an initial phase after a fast Fourier transform.

The IEEE 802.11ax standard also defines null subcarriers, which have zero energy. In one or more embodiments, null subcarriers may be used like pilot tones to facilitate WiFi signal detection. For example, transmitter 362 may populate null subcarriers with energy, and binary phase shift key (BPSK) modulated signals may be multiplied by $s_{t,w}$ and mapped into null subcarriers. As such, a detecting device (e.g., device 364) may detect a sinusoid function on both pilot tones and null subcarriers to identify a WiFi signal because both pilot tones and null subcarriers may be populated. By populating null subcarriers in the same manner as pilot tones, null subcarriers may be treated like pilot tones, generating more energy, and increasing the chance that a detecting device correctly identifies a signal.

It is understood that the above descriptions are for purposes of illustration and are not meant to be limiting.

Figure 3C:
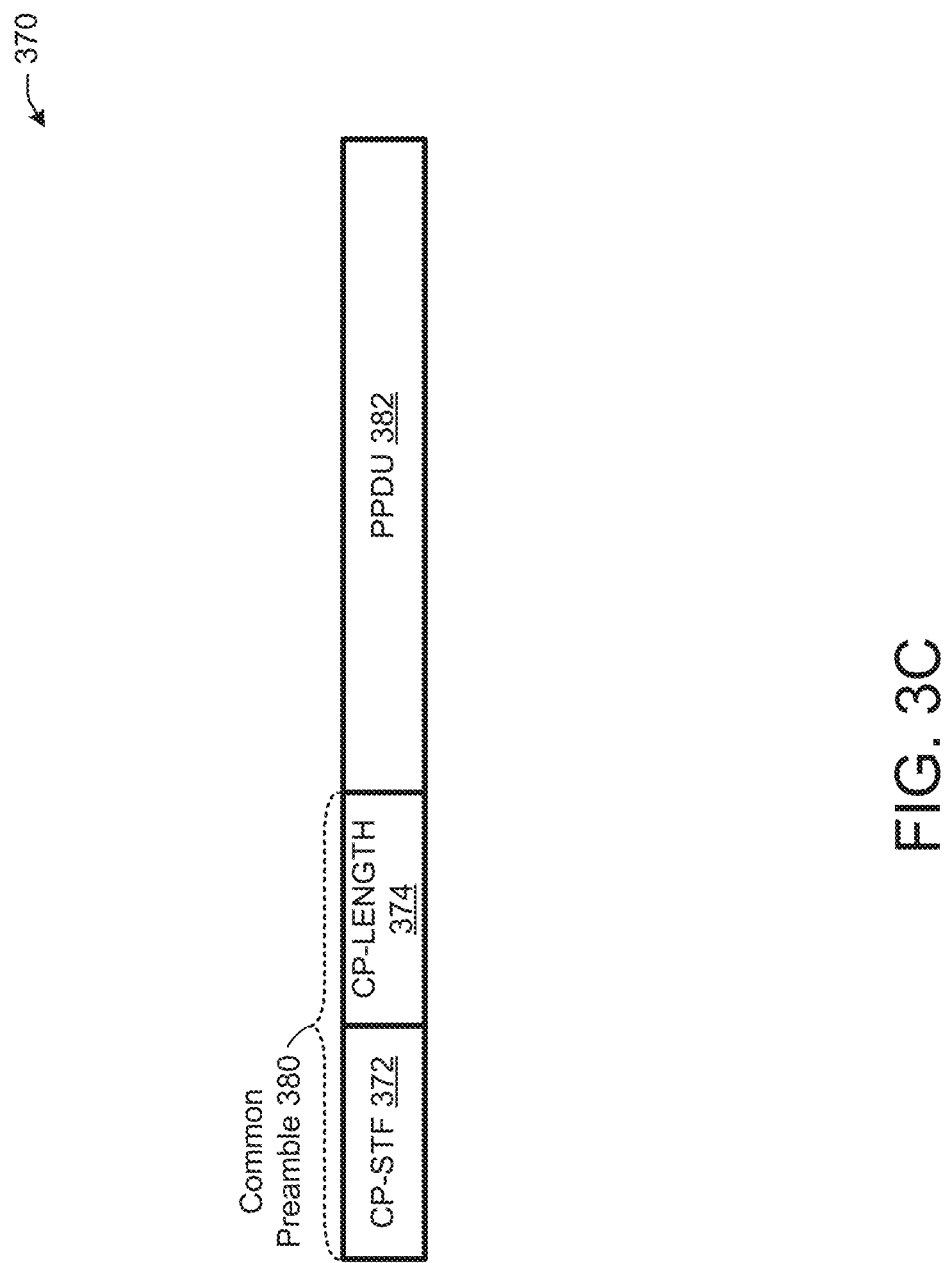
FIG. 3C depicts a frame structure for enhanced signal detection, in accordance with one or more example embodiments of the present disclosure.

FIG. 3C depicts a frame structure 370 for enhanced signal detection, in accordance with one or more example embodiments of the present disclosure.

Referring to FIG. 3C, the frame structure 370 for a frame may include one or more fields/sub-fields. For example, the frame structure 370 may include a common preamble short training (CP-STF) field 372 and a common preamble length (CP-LENGTH) field 374. The CP-STF field 372 and CP-LENGTH field 374 may form a common preamble 380, which may allow for both WiFi and non-WiFi devices to properly detect WiFi signals and make channel sensing determinations. The common preamble 380 may be appended to a PPDU 382, which may be a WiFi PPDU or a non-WiFi PPDU. For example, in a WiFi PPDU, fields/sub-fields of the PPDU 382 may be defined by the IEEE 802.11 family of standards based on different types of frames (e.g., high-throughput frames).

In one or more embodiments, the common preamble 380 may enable bilateral detection between WiFi and non-WiFi systems. The common preamble 380 may have the benefit of being detectable in a time domain within a reasonable amount of time. The common preamble 380 may not improperly trigger packet detection (e.g., may reduce false signal detection determinations). The common preamble 380 may have a low PAPR, and may also indicate the length of PPDU 382 in the time domain so that detecting devices may be able to account for a WiFi signal even when the detecting device is not a WiFi device.

In one or more embodiments, the CP-STF field 372 may be used for packet detection, and the CP-LENGTH field 374 may be used to indicate the length of PPDU 382. The structure of the CP-STF field 372 may be the same or similar to a short training field of a WiFi PPDU for simplicity and backward compatibility, but may have a different time domain signal periodicity. The structure may refer to a number of symbols, a number of subcarriers, or length. For example, a short training field in a high-throughput frame defined by the IEEE 802.11ax standard may have a time domain signal periodicity of 0.8 microseconds or 1.6 microseconds, and the CP-STF field 372 may have a time domain signal periodicity of 1.28 microseconds. The different time domain signal periodicities may allow devices to recognize whether a signal is a WiFi or non-WiFi signal. For example, if a device recognizes that a preamble has a time domain signal periodicity of 0.8 or 1.6 microseconds, the device may recognize that the preamble refers to a WiFi PPDU. A non-WiFi device that recognizes a WiFi PPDU may stop decoding, and even if aware that a channel is busy because of the signal it has detected, may not be aware of the PPDU length. The lack of awareness of PPDU length may lead to inefficiencies regarding channel sensing procedures. To allow for a non-WiFi device to recognize a WiFi frame and account for the length of the PPDU 382, the device may recognize the time domain signal periodicity of 1.28 microseconds from the CP-STF field 372 and may identify the length of the PPDU 382 based on the CP-LENGTH field 374. In addition, the different time domain signal periodicity of the CP-STF field 372 may help avoid false packet detection. For example, if the periodicity of a signal in an unlicensed band matched the predetermined periodicity of a WiFi PPDU, a detecting device may determine that the signal is a WiFi signal even if that is not the case. By having a different time domain signal periodicity, the CP-STF field 372 may not trigger a determination by a detecting device that a signal is a WiFi signal, and may allow a detecting device to make proper determinations about a signal whether the device is a WiFi or non-WiFi device.

In one or more embodiments, sequences M and a frequency mapping scheme for the CP-STF field 372 may be defined for different bandwidths (e.g., 40 MHz, 80 MHz, 160 MHz). The frequency mapping scheme may generate a time domain signal with a time domain signal periodicity of 1.28 microseconds (as discussed further below with regard to FIGS. 4A and 4B). To maintain frequency diversity while maintaining the time domain signal periodicity, the sequence M may be populated every ten subcarriers (e.g. a step value of 10) over a spectrum based on the bandwidth. A total duration of the scheme may be five periods, 6.4 microseconds, or a longer time value to allow for reliable signal detection. One sequence M may be represented by the sequence [1,1,1,1,1,1,1,−1,−1,−1,1,−1,1,1,−1,−1,−1,1,1,−1, 1,−1,−1,1].

When bandwidth=40 MHz, PAPR may be 5.43 dB. A spectrum may range from −240 to 240, and applying the sequence M may result in $S_{-240:10:240}^{common}=\{M,0,-M\}$. The "−240:10:240" may refer to the frequency spectrum from −240 to 240 with a step value of 10, meaning a pilot subcarrier may be applied every 10 frequency values (e.g., −240, −230, −220, . . . , 0, 10, 20, . . . , 240). However, the 0 frequency value may be a DC subcarrier with a value of 0. The sequence M may be applied from −240 to −10, the DC subcarrier may be applied at 0, and the sequence −M may be applied from 10 to 240.

When bandwidth=80 MHz, PAPR may be 5.15 dB. A spectrum may range from −490 to 490, and applying the sequence M may result in $S_{-490:10:490}^{common}=\{-M,-1,M,0,-M,1,-M\}$. The "−490:10:490" may refer to the frequency spectrum from −490 to 490 with a step value of 10, with a step value of 10, meaning a pilot subcarrier may be applied every 10 frequency values (e.g., −490, −480, −470, . . . , −10, 0, 10, 20, . . . , 490). However, the 0 frequency value may be a DC subcarrier with a value of 0. The sequence M may be applied from −490 to −260, then −1 may be inserted at −250, then the sequence M may be applied from −240 to −10. The DC subcarrier may be applied at 0, and the sequence −M may be applied from 10 to 240, then 1 may be inserted at 250, then the sequence −M may be applied from 260 to 490.

When bandwidth=160 MHz, PAPR may be 5.83 dB. A spectrum may range from −1010 to −520, from −520 to −20, from 20 to 500, and from 520 to 1010, and applying the sequence M may result in $$S_{-1010:10:-520,-500:10:-20,20:10:500,520:10:1010}^{common} =$$

$$\{M, 1, -M, 0, -M, 1, -M, -M, -1, M, 0, -M, 1, -M\}.$$

The "−1010:10:−520" may refer to the frequency spectrum from −1010 to −520, with a step value of 10, meaning a pilot subcarrier may be applied every 10 frequency values (e.g., −1090, −1080, −1070, . . . , −520). However, the 0 frequency value may be a DC subcarrier with a value of 0. The sequence M may be applied from −1010 to −780, then 1 may be inserted at −770, then the sequence −M may be applied from frequency −760 to −530. A DC subcarrier may be applied at −520, the sequence −M may be applied from −500 to −270, then 1 may be inserted at −260. The sequence −M may be applied from −250 to −20. The sequence −M may be applied from 20 to 250, then −1 may be inserted at 260. The sequence M may be applied from 270 to 500, then a DC subcarrier may be inserted at 520. The sequence −M may be applied from 530 to 760, then a 1 may be inserted at 770. The sequence −M may be applied from 780 to 1010.

It is understood that the above descriptions are for purposes of illustration and are not meant to be limiting.

FIG. 4A depicts an illustrative frequency mapping of a common pilot grid 400, in accordance with one or more example embodiments of the present disclosure.

FIG. 4B depicts an illustrative time domain signal 450, in accordance with one or more example embodiments of the present disclosure.

Referring to FIG. 4A, the frequency mapping of the common pilot grid 400 may refer to the mapping described above with regard to FIG. 3C, assuming subcarrier spacing of 78.125 KHz. In one or more embodiments, the frequency mapping of the common pilot grid 400 may include pilot tones 402, 404, 406, 408, 410, and 412 using a step value of 10 in the frequency domain. A DC subcarrier 414 is used at frequency 0.

Referring to FIG. 4B, the time domain signal 450 is shown within a time domain periodicity 452, which may be different from a time domain periodicity of a WiFi PPDU preamble short training field (e.g., different from the 0.8 or 1.6 microsecond periodicity of legacy WiFi short training fields). The time domain signal 450 is represented by a continuous phase because of the mapping described with regard to FIG. 3C, for example.

It is understood that the above descriptions are for purposes of illustration and are not meant to be limiting.

Figure 5:
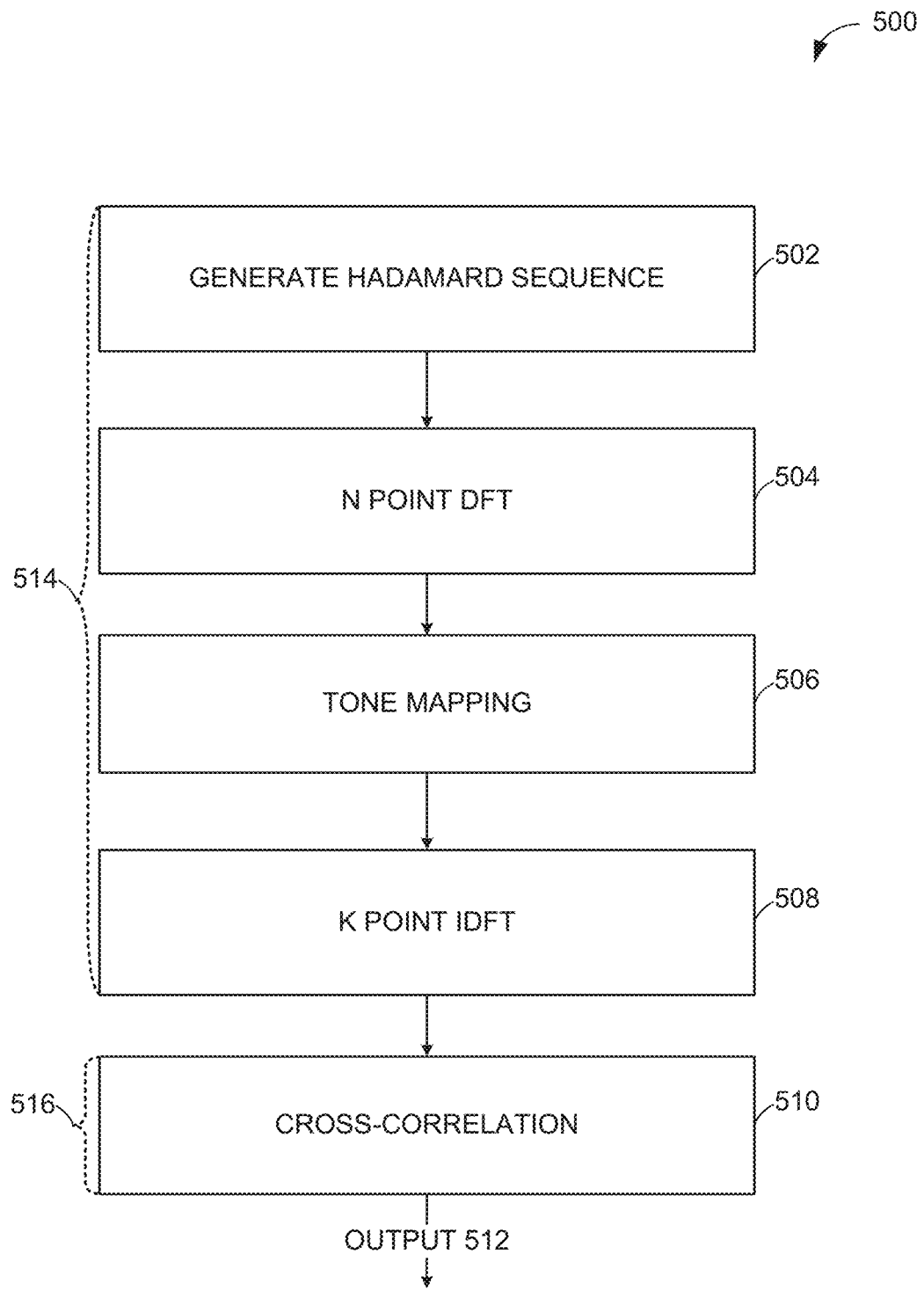
FIG. 5 illustrates a flow diagram of an illustrative process for generating and receiving a common preamble length field, in accordance with one or more example embodiments of the present disclosure.

FIG. 5 illustrates a flow diagram of an illustrative process 500 for generating and receiving a common preamble length field, in accordance with one or more example embodiments of the present disclosure.

Referring to FIG. 5, a CP-LENGTH field (e.g., CP-LENGTH field 374 of FIG. 3C) may be generated and received according to process 500.

In one or more embodiments, a Hadamard sequence may be generated at block 502. At block 504, an N-Point discrete Fourier transform (DFT) may be applied. At block 506, tone mapping may occur. At block 508, a K-point inverse discrete Fourier transform (IDFT) may be applied. At block 510, cross correlation of a waveform may occur to verify a waveform. The output 512 of block 510 may be the CP- LENGTH field (e.g., CP-LENGTH field 374 of FIG. 3C). Blocks 502, 504, 506, and 508 may be performed by one or more processors of a transmitting device 514 (e.g., AP 102 or user device 120 of FIG. 1). Block 516 may be performed by a receiving device (e.g., AP 102 or user device 120 of FIG. 1).

The Hadamard sequence of block 502 may be a square matrix with entries of 1 or −1, and whose rows are mutually orthogonal. The Hadamard sequence may be selected from a pool of N-point Hadamard sequence. Each Hadamard sequence in the pool of sequences may "piggyback" unique length information of a current PPDU. The N-point discrete Fourier transform may be applied to the Hadamard sequence at bock 504, and the sequence may then be mapped in to a frequency domain at block 506. After mapping, the sequence may be applied to a K-point inverse discrete Fourier transform at block 508 and sent to a receiving device (e.g., AP 102 or user device 120 of FIG. 1). The receiving device may then perform cross-correlation at block 510 to verify a waveform.

In one or more embodiments, N=64 point Hadamard codes may be used for block 502. A first code may correspond to a 50 microsecond PPDU length, and a second code may correspond to a 100 microsecond PPDU length. Alternatively, N=128 point Hadamard codes may be used for a finer step size in PPDU length.

It is understood that the above descriptions are for purposes of illustration and are not meant to be limiting.

Figure 6A:
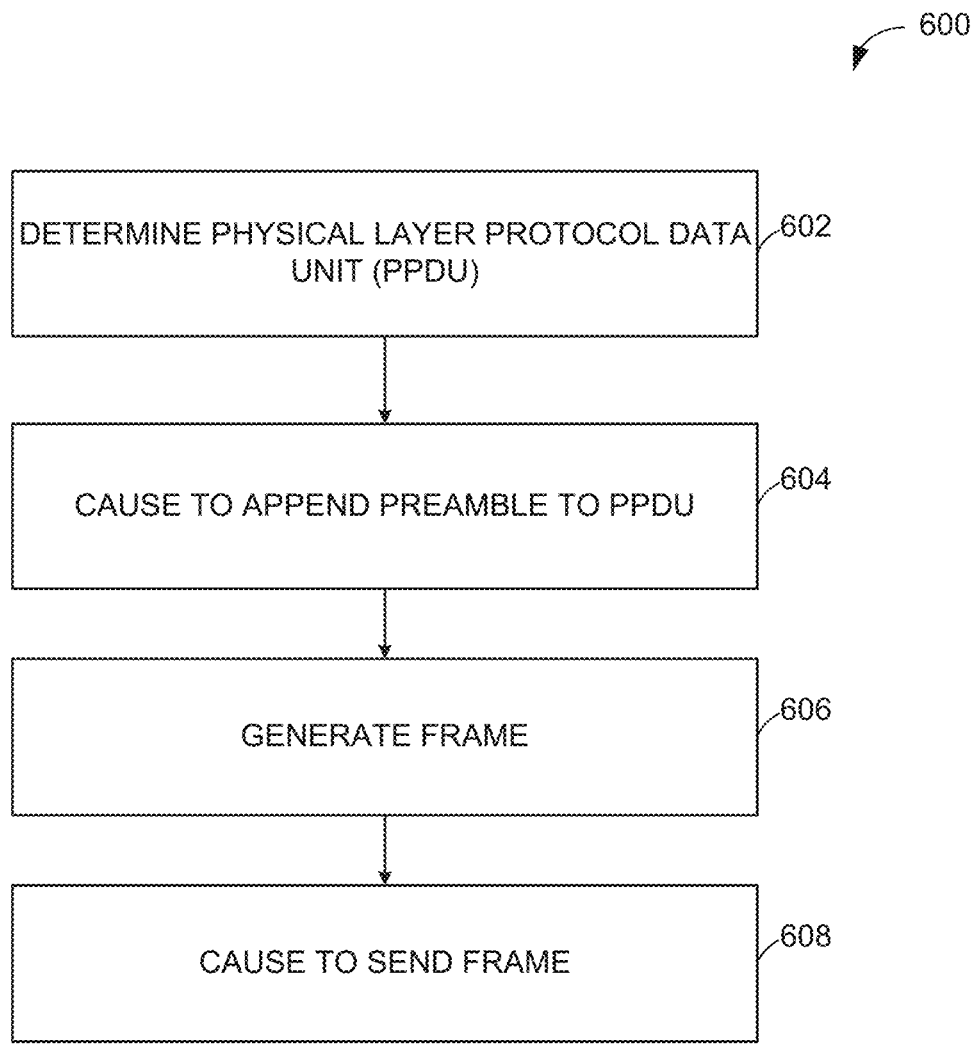
FIG. 6A illustrates a flow diagram of an illustrative process for enhanced signal detection, in accordance with one or more example embodiments of the present disclosure.

FIG. 6A illustrates a flow diagram of an illustrative process 600 for enhanced signal detection, in accordance with one or more example embodiments of the present disclosure.

At block 602, one or more processors of a device (e.g., the user device(s) 120 and/or the AP 102 of FIG. 1) may determine a PPDU (e.g., PPDU 382 of FIG. 3C). The PPDU may include one or more symbols. The PPDU may have a first time domain signal periodicity. A symbol (e.g., symbol 302 of FIG. 3A) of the one or more symbols may include a beginning portion (e.g., CP 308 of FIG. 3A) and an end portion (e.g., end portion 304 of FIG. 3A), wherein the beginning portion has a time duration (e.g., time duration 310 of FIG. 3A), and wherein the ending portion is based on the time duration. The beginning portion and end portion may include the same information/content. If the frame is a WiFi PPDU, the first time domain signal periodicity may be 0.8 microseconds or 1.6 microseconds. If the frame is not a WiFi frame, the first time domain signal periodicity may be another value. A symbol of the one or more symbols may be associated with pilot subcarriers, and the pilot subcarriers may be associated with a contiguous phase.

At block 604, one or more processors of the device may cause the device to append a common preamble (e.g., common preamble 380 of FIG. 3C) to the PPDU (e.g., PPDU 382 of FIG. 3C). The common preamble may include a common short training field (e.g., CP-STF 372 of FIG. 3C) and a common preamble length field (e.g., CP-LENGTH 374 of FIG. 3C). The common short training field may have a second time domain periodicity that is different from the first time domain periodicity. The common preamble length field may indicate a length of the PPDU.

At block 606, one or more processors of the device may generate a frame. The frame may include the common preamble (e.g., common preamble 380 of FIG. 3C) and the PPDU (e.g., PPDU 382 of FIG. 3C). The first time domain signal periodicity may indicate that the PPDU is either a WiFi PPDU or a non-WiFi PPDU (e.g., a type of PPDU). A signal of a pilot subcarrier of the frame may be represented by $p^t_1 = a_1 \sin(w_1 + \varphi_1) * s_{t,w}$, where p is a pilot tone at a respective time in a time domain, t is the respective time in the time domain, a is an amplitude, w is a respective frequency in a frequency domain, $\varphi$ is a phase, and $s_{t,w}$ is a sequence that depends on the respective time and the respective frequency. To map a sequence of symbols for pilot subcarriers to the frequency domain, a sequence [1, 1, 1, 1, 1, 1, 1, −1, −1, −1, 1, −1, 1, 1, −1, −1, −1, 1, 1, −1, 1, −1, −1, 1] may be mapped to a spectrum associated with a bandwidth, the mapping represented by a first sequence {M, 0, −M} if a bandwidth is 40 MHz, a second sequence {−M, −1, M, 0, −M, 1, −M} if the bandwidth is 80 MHz, or by a third sequence {M, 1, −M, 0, −M, 1, −M, −M, −1, M, 0, −M, 1, −M} if the bandwidth is 160 MHz.

At block 608, one or more processors of the device may cause the device to send the frame. The common preamble may allow a receiving device to identify the frame and whether the device is a WiFi device or not.

It is understood that the above descriptions are for purposes of illustration and are not meant to be limiting.

Figure 6B:
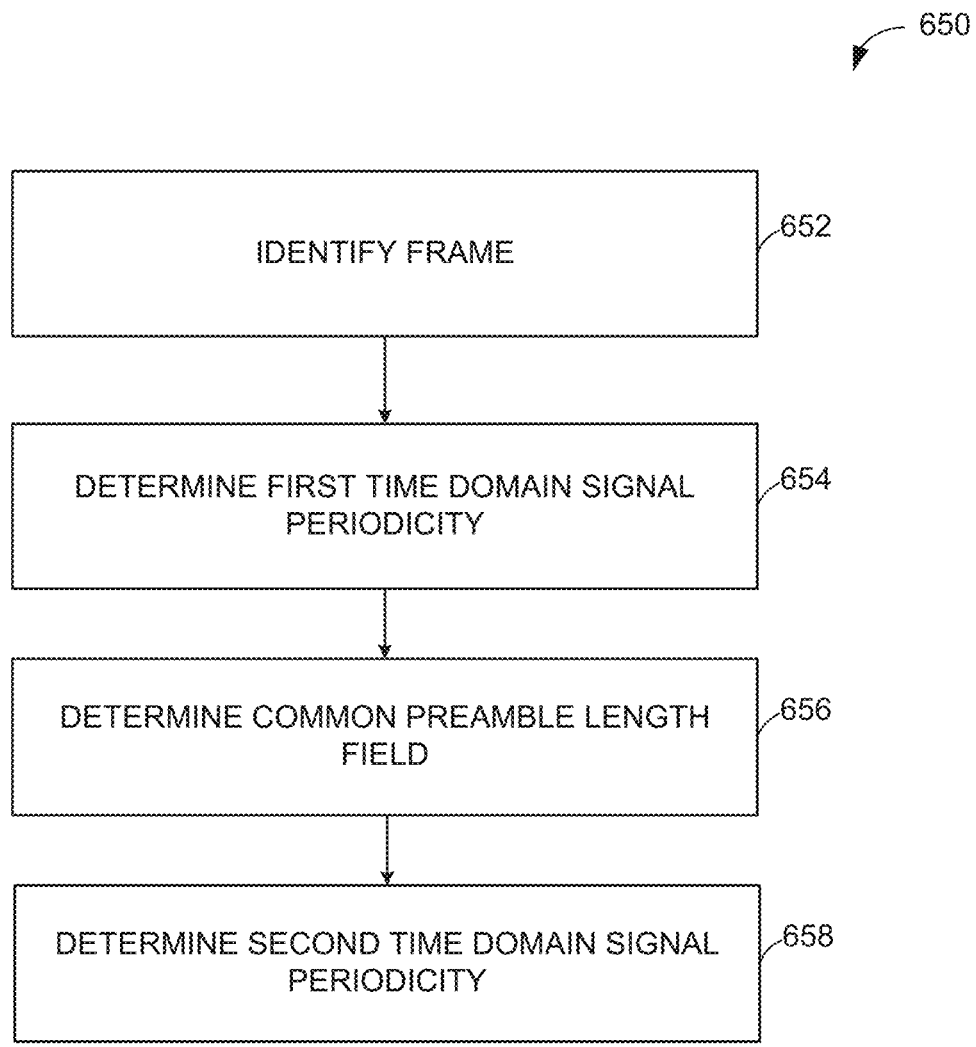
FIG. 6B illustrates a flow diagram of an illustrative process for enhanced signal detection, in accordance with one or more example embodiments of the present disclosure.

FIG. 6B illustrates a flow diagram of an illustrative process 650 for enhanced signal detection, in accordance with one or more example embodiments of the present disclosure.

At block 652, one or more processors of a device (e.g., the user device(s) 120 and/or the AP 102 of FIG. 1) may identify a frame. The frame may include a PPDU (e.g., PPDU 382 of FIG. 3C), a common preamble (e.g., common preamble 380 of FIG. 3C), and one or more symbols (e.g., symbol 302 of FIG. 3A). A symbol of the one or more symbols may be associated with pilot subcarriers having a contiguous phase. Cyclic prefix verification may be performed on the one or more symbols. For example, a symbol may have a beginning portion (e.g., CP 308 of FIG. 3A) and an end portion (e.g., end portion 304 of FIG. 3A), wherein the beginning portion has a time duration (e.g., time duration 310 of FIG. 3A), and wherein the ending portion is based on the time duration. If the beginning portion of the symbol and the end portion of the symbol match (e.g., comprise the same content/information), then the cyclic prefix verification may pass.

At block 654, one or more processors of the device may determine a first time domain signal periodicity associated with a common short training field (e.g., CP-STF 372 of FIG. 3C) of the common preamble (e.g., common preamble 380 of FIG. 3C).

At block 656, one or more processors of the device may determine a common preamble length field (e.g., CP-LENGTH 374 of FIG. 3C). The common preamble length field may indicate a length of the PPDU (e.g., PPDU 382 of FIG. 3C), and the common preamble (e.g., common preamble 380 of FIG. 3C) may include the common preamble length field. The common preamble length field may be generated based on a Hadamard code, and wherein the Hadamard code is associated with the length of the PPDU.

At block 658, one or more processors of the device may determine a second time domain signal periodicity associated with the PPDU (e.g., PPDU 382 of FIG. 3C). The second time domain signal periodicity may indicate whether the PPDU is a WiFi PPDU or a non-WiFi PPDU (e.g., a type of PPDU). If the PPDU is a WiFi PPDU, the second time domain signal periodicity may be 0.8 microseconds or 1.6 microseconds, and the device may determine the one or more symbols. If the second time domain signal periodicity is another value (e.g., if the PPDU is not a WiFi PPDU), the device may discard the frame.

It is understood that the above descriptions are for purposes of illustration and are not meant to be limiting.

FIG. 7 shows a functional diagram of an exemplary communication station 700 in accordance with some embodiments. In one embodiment, FIG. 7 illustrates a functional block diagram of a communication station that may be suitable for use as an AP 102 (FIG. 1) or a user device 120 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in FIGS. 2, 3A, 3B, 4A, 4B 5, 6A, and 6B.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device memory.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), an enhanced signal detection device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The enhanced signal detection device 819 may carry out or perform any of the operations and processes (e.g., process 600 of FIG. 6A, and process 650 of FIG. 6B) described and shown above.

In one or more embodiments, the enhanced signal detection device 819 may determine a PPDU comprising one or more symbols, wherein the PPDU has a first time domain signal periodicity.

In one or more embodiments, the enhanced signal detection device 819 may cause to append a common preamble to the PPDU, wherein the common preamble comprises a common short training field and a common preamble length field, the common short training field having a second time domain signal periodicity different from the first time domain signal periodicity, and the common preamble length field indicating a length of the PPDU.

In one or more embodiments, the enhanced signal detection device 819 may generate a frame, the frame comprising the common preamble and the PPDU, wherein the first time domain signal periodicity indicates a type of PPDU.

In one or more embodiments, the enhanced signal detection device 819 may cause to send the frame.

In one or more embodiments, the enhanced signal detection device 819 may map the common short training field based on a bandwidth associated with a spectrum, and wherein to map comprises to apply a sequence [1, 1, 1, 1, 1, 1, 1, −1, −1, −1, 1, −1, 1, 1, −1, −1, −1, 1, 1, −1, 1, −1, −1, 1] to the spectrum.

In one or more embodiments, the enhanced signal detection device 819 may identify a frame comprising a PPDU, a common preamble, and one or more symbols.

In one or more embodiments, the enhanced signal detection device 819 may determine a first time domain signal periodicity associated with a common short training field of the common preamble.

In one or more embodiments, the enhanced signal detection device 819 may determine a common preamble length field indicating a length of the PPDU, the common preamble comprising the common preamble length field.

In one or more embodiments, the enhanced signal detection device 819 may determine a second time domain signal periodicity associated with the PPDU, the second time domain signal periodicity indicating a type of PPDU.

It is understood that the above are only a subset of what the enhanced signal detection device 819 may be configured to perform and that other functions included throughout this disclosure may also be performed by the enhanced signal detection device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a single input single output (SISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended PRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1, the device comprising memory and processing circuitry configured to: determine a physical layer protocol data unit (PPDU) comprising one or more symbols, wherein the PPDU has a first time domain signal periodicity; cause to append a common preamble to the PPDU, wherein the common preamble comprises a common short training field and a common preamble length field, the common short training field having a second time domain signal periodicity different from the first time domain signal periodicity, and the common preamble length field indicating a length of the PPDU; generate a frame, the frame comprising the common preamble and the PPDU, wherein the first time domain signal periodicity indicates a type of PPDU; and cause to send the frame.

Example 2 may include the device of example 1 and/or some other example herein, wherein a symbol of the one or more symbols comprises a beginning portion and an end portion, wherein the beginning portion has a time duration, wherein the ending portion is based on the time duration, and wherein the beginning portion and the ending portion comprise the same content.

Example 3 may include the device of example 1 and/or some other example herein, wherein the type of PPDU is a WiFi PPDU, and wherein the first time domain signal periodicity is 0.8 microseconds or 1.6 microseconds.

Example 4 may include the device of example 1 and/or some other example herein, wherein the type of PPDU is a non-WiFi PPDU, and wherein the first time domain signal periodicity is a value other than 0.8 microseconds or 1.6 microseconds.

Example 5 may include the device of example 1 and/or some other example herein, wherein the memory and processing circuitry are further configured to map the common short training field based on a bandwidth associated with a frequency spectrum, and wherein to map comprises to apply a sequence [1, 1, 1, 1, 1, 1, 1, −1, −1, −1, 1, −1, 1, 1, −1, −1, −1, 1, 1, −1, 1, −1, −1, 1] to the frequency spectrum.

Example 6 may include the device of example 1 and/or some other example herein, wherein the common preamble length field is generated based on a Hadamard code, and wherein the Hadamard code is associated with the length of the PPDU.

Example 7 may include the device of example 1 and/or some other example herein, wherein a symbol of the one or more symbols is associated with pilot subcarriers, and wherein the pilot subcarriers are associated with a contiguous phase.

Example 8 may include the device of example 1 and/or some other example herein, further comprising a transceiver configured to transmit and receive wireless signals Example 9 may include the device of example 7 and/or some other example herein, further comprising one or more antennas coupled to the transceiver Example 10 may include a non-transitory computer-readable medium storing computer-executable instructions which when executed by one or more processors result in performing operations comprising: identifying, at a first device, a frame comprising a physical layer protocol data unit (PPDU), a common preamble, and one or more symbols; determining a first time domain signal periodicity associated with a common short training field of the common preamble; determining a common preamble length field indicating a length of the PPDU, the common preamble comprising the common preamble length field; and determining a second time domain signal periodicity associated with the PPDU, the second time domain signal periodicity indicating a type of PPDU.

Example 11 may include the non-transitory computer-readable medium of example 10 and/or some other example herein, wherein a symbol of the one or more symbols comprises a beginning portion and an end portion, and wherein the operations further comprise determining that the beginning portion and the ending portion comprise the same content.

Example 12 may include the non-transitory computer-readable medium of example 10 and/or some other example herein, wherein a symbol of the one or more symbols comprises a beginning portion and an end portion, and wherein the operations further comprise determining that the beginning portion and the ending portion comprise different content.

Example 13 may include the non-transitory computer-readable medium of example 10 and/or some other example herein, wherein the type of PPDU is a WiFi PPDU, wherein the second time domain signal periodicity is 0.8 microseconds or 1.6 microseconds, and wherein the operations further comprise determining the one or more symbols.

Example 14 may include the non-transitory computer-readable medium of example 10 and/or some other example herein, wherein the type of PPDU is a non-WiFi PPDU, and wherein the second time domain signal periodicity is a value other than 0.8 microseconds or 1.6 microseconds.

Example 15 may include the non-transitory computer-readable medium of example 10 and/or some other example herein, wherein the common short training field is mapped based on a bandwidth associated with a frequency spectrum, and wherein to map comprises to apply a sequence [1, 1, 1, 1, 1, 1, 1, −1, −1, −1, 1, −1, 1, 1, −1, −1, −1, 1, 1, −1, 1, −1, −1, 1] to the frequency spectrum.

Example 16 may include the non-transitory computer-readable medium of example 10 and/or some other example herein, wherein the common preamble length field is generated based on a Hadamard code, and wherein the Hadamard code is associated with the length of the PPDU.

Example 17 may include the non-transitory computer-readable medium of example 10 and/or some other example herein, wherein a symbol of the one or more symbols is associated with pilot subcarriers, and wherein the pilot subcarriers are associated with a contiguous phase.

Example 18 may include a method comprising: determining, by one or more processors of a first device, determine a physical layer protocol data unit (PPDU) comprising one or more symbols, wherein the PPDU has a first time domain signal periodicity; causing to append a common preamble to the PPDU, wherein the common preamble comprises a common short training field and a common preamble length field, the common short training field having a second time domain signal periodicity different from the first time domain signal periodicity, and the common preamble length field indicating a length of the PPDU; generating a frame, the frame comprising the common preamble and the PPDU, wherein the first time domain signal periodicity indicates a type of PPDU; and causing to send, by the one or more processors, the frame.

Example 19 may include the method of example 18 and/or some other example herein, wherein a signal of a pilot subcarrier of the frame is represented by $p'_1 = a_1 \sin(w_1 + \varphi_1) * s_{t,w}$, where p is a pilot tone at a respective time in a time domain, t is the respective time in the time domain, a is an amplitude, w is a respective frequency in a frequency domain, $\varphi$ is a phase, and $s_{t,w}$ is a sequence that depends on the respective time and the respective frequency.

Example 20 may include the method of example 18 and/or some other example herein, further comprising mapping a sequence [1, 1, 1, 1, 1, 1, 1, −1, −1, −1, 1, −1, 1, 1, −1, −1, 1, 1, −1, −1, 1, −1, −1, 1] to a frequency spectrum associated with a bandwidth, the mapping represented by a first sequence {M, 0, −M} if a bandwidth is 40 MHz, a second sequence {−M, −1, M, 0, −M, 1, −M} if the bandwidth is 80 MHz, or by a third sequence {M, 1, −M, 0, −M, 1, −M, −M, −1, M, 0, −M, 1, −M} if the bandwidth is 160 MHz.

Example 21 may include the method of example 18 and/or some other example herein, wherein a symbol of the one or more symbols comprises a beginning portion and an end portion, wherein the beginning portion has a time duration, wherein the ending portion is based on the time duration, and wherein the beginning portion and the ending portion comprise the same content.

Example 22 may include the method of example 18 and/or some other example herein, wherein the type of PPDU is a WiFi PPDU, and wherein the first time domain signal periodicity is 0.8 microseconds or 1.6 microseconds.

Example 23 may include the method of example 18 and/or some other example herein, wherein the type of PPDU is a non-WiFi PPDU, and wherein the first time domain signal periodicity is a value other than 0.8 microseconds or 1.6 microseconds.

Example 24 may include the method of example 18 and/or some other example herein, wherein the common preamble length field is generated based on a Hadamard code, and wherein the Hadamard code is associated with the length of the PPDU.

Example 25 may include the method of example 18 and/or some other example herein, wherein a symbol of the one or more symbols is associated with pilot subcarriers, and wherein the pilot subcarriers are associated with a contiguous phase.

Example 26 may include the method of example 18 and/or some other example herein, further comprising mapping the common short training field based on a bandwidth associated with a frequency spectrum, and wherein to map comprises to apply a sequence [1, 1, 1, 1, 1, 1, 1, −1, −1, −1, 1, −1, 1, 1, −1, −1, −1, 1, 1, −1, 1, −1, −1, 1] to the frequency spectrum.

Example 27 may include an apparatus comprising means for performing a method as claimed in any one of examples 18-26.

Example 28 may include a system, comprising at least one memory device having programmed instruction that, in response to execution cause at least one processor to perform the method of any one of examples 18-26.

Example 29 may include a system, comprising at least one memory device having programmed instruction that, in response to execution cause at least one processor to perform the method of any one of examples 18-26.

Example 30 may include the device of example 1 and/or some other example herein, wherein a signal of a pilot subcarrier of the frame is represented by $p'_1 = a_1 \sin(w_1 + \varphi_1) * s_{t,w}$, where p is a pilot tone at a respective time in a time domain, t is the respective time in the time domain, a is an amplitude, w is a respective frequency in a frequency domain, $\varphi$ is a phase, and $s_{t,w}$ is a sequence that depends on the respective time and the respective frequency.

Example 31 may include the device of example 1 and/or some other example herein, wherein the memory and processing circuitry are further configured to map a sequence [1, 1, 1, 1, 1, 1, 1, −1, −1, −1, 1, −1, 1, 1, −1, −1, −1, 1, 1, −1, 1, −1, −1, 1] to a frequency spectrum associated with a bandwidth, the mapping represented by a first sequence {M, 0, −M} if a bandwidth is 40 MHz, a second sequence {−M, −1, M, 0, −M, 1, −M} if the bandwidth is 80 MHz, or by a third sequence {M, 1, −M, 0, −M, 1, −M, −M, −1, M, 0, −M, 1, −M} if the bandwidth is 160 MHz.

Example 32 may include a non-transitory computer-readable medium storing computer-executable instructions which when executed by one or more processors result in performing operations comprising: determining, by one or more processors of a first device, determine a physical layer protocol data unit (PPDU) comprising one or more symbols, wherein the PPDU has a first time domain signal periodicity; cause to append a common preamble to the PPDU, wherein the common preamble comprises a common short training field and a common preamble length field, the common short training field having a second time domain signal periodicity different from the first time domain signal periodicity, and the common preamble length field indicating a length of the PPDU; generate a frame, the frame comprising the common preamble and the PPDU, wherein the first time domain signal periodicity indicates a type of PPDU; and causing to send, by the one or more processors, the frame.

Example 33 may include the non-transitory computer-readable medium of example 32 and/or some other example herein, wherein a signal of a pilot subcarrier of the frame is represented by $p'_1 = a_1 \sin(w_1 + \varphi_1) * s_{t,w}$, where p is a pilot tone at a respective time in a time domain, t is the respective time in the time domain, a is an amplitude, w is a respective frequency in a frequency domain, $\varphi$ is a phase, and $s_{t,w}$ is a sequence that depends on the respective time and the respective frequency.

Example 34 may include the non-transitory computer-readable medium of example 32 and/or some other example herein, the operations further comprising mapping a sequence [1, 1, 1, 1, 1, 1, 1, −1, −1, −1, 1, −1, 1, 1, −1, −1, −1, 1, 1, −1, 1, −1, −1, 1] to a frequency spectrum associated with a bandwidth, the mapping represented by a first sequence {M, 0, −M} if a bandwidth is 40 MHz, a second sequence {−M, −1, M, 0, −M, 1, −M} if the bandwidth is 80 MHz, or by a third sequence {M, 1, −M, 0, −M, 1, −M, −M, −1, M, 0, −M, 1, −M} if the bandwidth is 160 MHz.

Example 35 may include the non-transitory computer-readable medium of example 32 and/or some other example herein, wherein a symbol of the one or more symbols comprises a beginning portion and an end portion, wherein the beginning portion has a time duration, wherein the ending portion is based on the time duration, and wherein the beginning portion and the ending portion comprise the same content.

Example 36 may include the non-transitory computer-readable medium of example 32 and/or some other example herein, wherein the type of PPDU is a WiFi PPDU, and wherein the first time domain signal periodicity is 0.8 microseconds or 1.6 microseconds.

Example 37 may include the non-transitory computer-readable medium of example 32 and/or some other example herein, wherein the type of PPDU is a non-WiFi PPDU, and wherein the first time domain signal periodicity is a value other than 0.8 microseconds or 1.6 microseconds.

Example 38 may include the non-transitory computer-readable medium of example 32 and/or some other example herein, wherein the common preamble length field is generated based on a Hadamard code, and wherein the Hadamard code is associated with the length of the PPDU.

Example 39 may include the non-transitory computer-readable medium of example 32 and/or some other example herein, wherein a symbol of the one or more symbols is associated with pilot subcarriers, and wherein the pilot subcarriers are associated with a contiguous phase.

Example 40 may include the non-transitory computer-readable medium of example 32 and/or some other example herein, further comprising mapping the common short training field based on a bandwidth associated with a frequency spectrum, and wherein mapping comprises to apply a sequence [1, 1, 1, 1, 1, 1, 1, −1, −1, −1, 1, −1, 1, 1, −1, −1, −1, 1, 1, −1, 1, −1, −1, 1] to the frequency spectrum.

Example 41 may include an apparatus comprising means for: means for determining a physical layer protocol data unit (PPDU) comprising one or more symbols, wherein the PPDU has a first time domain signal periodicity; means for causing to append a common preamble to the PPDU, wherein the common preamble comprises a common short training field and a common preamble length field, the common short training field having a second time domain signal periodicity different from the first time domain signal periodicity, and the common preamble length field indicating a length of the PPDU; means for generating a frame, the frame comprising the common preamble and the PPDU, wherein the first time domain signal periodicity indicates a type of PPDU; and means for causing to send, by the one or more processors, the frame.

Example 42 may include the apparatus of example 41 and/or some other example herein, wherein a signal of a pilot subcarrier of the frame is represented by $p^t_1 = a_1 \sin(w_1 + \varphi_1) * s_{t,w}$, where p is a pilot tone at a respective time in a time domain, t is the respective time in the time domain, a is an amplitude, w is a respective frequency in a frequency domain, $\varphi$ is a phase, and $s_{t,w}$ is a sequence that depends on the respective time and the respective frequency.

Example 43 may include the apparatus of example 41 and/or some other example herein, further comprising means for mapping a sequence [1, 1, 1, 1, 1, 1, 1, −1, −1, −1, 1, −1, 1, 1, −1, −1, −1, 1, 1, −1, 1, −1, −1, 1] to a frequency spectrum associated with a bandwidth, the mapping represented by a first sequence {M, 0, −M} if a bandwidth is 40 MHz, a second sequence {−M, −1, M, 0, −M, 1, −M} if the bandwidth is 80 MHz, or by a third sequence {M, 1, −M, 0, −M, 1, −M, −M, −1, M, 0, −M, 1, −M} if the bandwidth is 160 MHz.

Example 44 may include the apparatus of example 41 and/or some other example herein, wherein a symbol of the one or more symbols comprises a beginning portion and an end portion, wherein the beginning portion has a time duration, wherein the ending portion is based on the time duration, and wherein the beginning portion and the ending portion comprise the same content.

Example 45 may include the apparatus of example 41 and/or some other example herein, wherein the type of PPDU is a WiFi PPDU, and wherein the first time domain signal periodicity is 0.8 microseconds or 1.6 microseconds.

Example 46 may include the apparatus of example 41 and/or some other example herein, wherein the type of PPDU is a non-WiFi PPDU, and wherein the first time domain signal periodicity is a value other than 0.8 microseconds or 1.6 microseconds.

Example 47 may include the apparatus of example 41 and/or some other example herein, wherein the common preamble length field is generated based on a Hadamard code, and wherein the Hadamard code is associated with the length of the PPDU.

Example 48 may include the apparatus of example 41 and/or some other example herein, wherein a symbol of the one or more symbols is associated with pilot subcarriers, and wherein the pilot subcarriers are associated with a contiguous phase.

Example 49 may include the apparatus of example 41 and/or some other example herein, further comprising means for mapping the common short training field based on a bandwidth associated with a frequency spectrum, and wherein the means to map comprises means to apply a sequence [1, 1, 1, 1, 1, 1, 1, −1, −1, −1, 1, −1, 1, 1, −1, −1, −1, 1, 1, −1, 1, −1, −1, 1] to the frequency spectrum.

Example 50, the device comprising memory and processing circuitry configured to: identify a frame comprising a physical layer protocol data unit (PPDU), a common preamble, and one or more symbols; determine a first time domain signal periodicity associated with a common short training field of the common preamble; determine a common preamble length field indicating a length of the PPDU, the common preamble comprising the common preamble length field; and determine a second time domain signal periodicity associated with the PPDU, the second time domain signal periodicity indicating a type of PPDU.

Example 51 may include the device of example 50 and/or some other example herein, wherein a symbol of the one or more symbols comprises a beginning portion and an end portion, and wherein the memory and processing circuitry are further configured to determine that the beginning portion and the ending portion comprise the same content.

Example 52 may include the device of example 50 and/or some other example herein, wherein a symbol of the one or more symbols comprises a beginning portion and an end portion, and wherein the operations further comprise determining that the beginning portion and the ending portion comprise different content.

Example 53 may include the device of example 50 and/or some other example herein, wherein the type of PPDU is a WiFi PPDU, wherein the second time domain signal periodicity is 0.8 microseconds or 1.6 microseconds, and wherein the memory and processing circuitry are further configured to determine the one or more symbols.

Example 54 may include the device of example 50 and/or some other example herein, wherein the type of PPDU is a non-WiFi PPDU, and wherein the second time domain signal periodicity is a value other than 0.8 microseconds or 1.6 microseconds.

Example 55 may include the device of example 50 and/or some other example herein, wherein the common short training field is mapped based on a bandwidth associated with a frequency spectrum, and wherein to map comprises to apply a sequence [1, 1, 1, 1, 1, 1, 1, −1, −1, −1, 1, −1, 1, 1, −1, −1, −1, 1, 1, −1, 1, −1, −1, 1] to the frequency spectrum.

Example 56 may include the device of example 50 and/or some other example herein, wherein the common preamble length field is generated based on a Hadamard code, and wherein the Hadamard code is associated with the length of the PPDU.

Example 57 may include the device of example 50 and/or some other example herein, wherein a symbol of the one or more symbols is associated with pilot subcarriers, and wherein the pilot subcarriers are associated with a contiguous phase.

Example 58 may include the device of example 1 and/or some other example herein, further comprising a transceiver configured to transmit and receive wireless signals.

Example 59 may include the device of example 58 and/or some other example herein, further comprising one or more antennas coupled to the transceiver.

Example 60 may include a method comprising: identifying, by one or more processors of a first device, a frame comprising a physical layer protocol data unit (PPDU), a common preamble, and one or more symbols; determining a first time domain signal periodicity associated with a common short training field of the common preamble; determining a common preamble length field indicating a length of the PPDU, the common preamble comprising the common preamble length field; and determining a second time domain signal periodicity associated with the PPDU, the second time domain signal periodicity indicating a type of PPDU.

Example 61 may include the method of example 60 and/or some other example herein, wherein a symbol of the one or more symbols comprises a beginning portion and an end portion, and the method further comprising determining that the beginning portion and the ending portion comprise the same content.

Example 62 may include the method of example 60 and/or some other example herein, wherein a symbol of the one or more symbols comprises a beginning portion and an end portion, and the method further comprising determining that the beginning portion and the ending portion comprise different content.

Example 63 may include the method of example 60 and/or some other example herein, wherein the type of PPDU is a WiFi PPDU, wherein the second time domain signal periodicity is 0.8 microseconds or 1.6 microseconds, and the method further comprising determining the one or more symbols.

Example 64 may include the method of example 60 and/or some other example herein, wherein the type of PPDU is a non-WiFi PPDU, and wherein the second time domain signal periodicity is a value other than 0.8 microseconds or 1.6 microseconds.

Example 65 may include the method of example 60 and/or some other example herein, wherein the common short training field is mapped based on a bandwidth associated with a frequency spectrum, and wherein to map comprises to apply a sequence [1, 1, 1, 1, 1, 1, 1, −1, −1, −1, 1, −1, 1, 1, −1, −1, −1, 1, 1, −1, 1, −1, −1, 1] to the frequency spectrum.

Example 66 may include the method of example 60 and/or some other example herein, wherein the common preamble length field is generated based on a Hadamard code, and wherein the Hadamard code is associated with the length of the PPDU.

Example 67 may include the method of example 60 and/or some other example herein, wherein a symbol of the one or more symbols is associated with pilot subcarriers, and wherein the pilot subcarriers are associated with a contiguous phase.

Example 68 may include an apparatus comprising means for performing a method as claimed in any one of examples 60-67.

Example 69 may include a system, comprising at least one memory device having programmed instruction that, in response to execution cause at least one processor to perform the method of any one of examples 60-67.

Example 70 may include a system, comprising at least one memory device having programmed instruction that, in response to execution cause at least one processor to perform the method of any one of examples 60-67.

Example 71 may include an apparatus comprising: means for identifying a frame comprising a physical layer protocol data unit (PPDU), a common preamble, and one or more symbols; means for determining a first time domain signal periodicity associated with a common short training field of the common preamble; means for determining a common preamble length field indicating a length of the PPDU, the common preamble comprising the common preamble length field; and means for determining a second time domain signal periodicity associated with the PPDU, the second time domain signal periodicity indicating a type of PPDU.

Example 72 may include the apparatus of example 71 and/or some other example herein, wherein a symbol of the one or more symbols comprises a beginning portion and an end portion, and the apparatus further comprising means for determining that the beginning portion and the ending portion comprise the same content.

Example 73 may include the apparatus of example 71 and/or some other example herein, wherein a symbol of the one or more symbols comprises a beginning portion and an end portion, and the apparatus further comprising means for determining that the beginning portion and the ending portion comprise different content.

Example 74 may include the apparatus of example 71 and/or some other example herein, wherein the type of PPDU is a WiFi PPDU, wherein the second time domain signal periodicity is 0.8 microseconds or 1.6 microseconds, and the apparatus further comprising means for determining the one or more symbols.

Example 75 may include the apparatus of example 71 and/or some other example herein, wherein the type of PPDU is a non-WiFi PPDU, and wherein the second time domain signal periodicity is a value other than 0.8 microseconds or 1.6 microseconds.

Example 76 may include the apparatus of example 71 and/or some other example herein, wherein the common short training field is mapped based on a bandwidth associated with a frequency spectrum, and wherein to map comprises to apply a sequence [1, 1, 1, 1, 1, 1, 1, −1, −1, −1, 1, −1, 1, 1, −1, −1, −1, 1, 1, −1, 1, −1, −1, 1] to the frequency spectrum.

Example 77 may include the apparatus of example 71 and/or some other example herein, wherein the common preamble length field is generated based on a Hadamard code, and wherein the Hadamard code is associated with the length of the PPDU.

Example 78 may include the apparatus of example 71 and/or some other example herein, wherein a symbol of the one or more symbols is associated with pilot subcarriers, and wherein the pilot subcarriers are associated with a contiguous phase.

Example 79 may include an apparatus comprising means for performing a method as claimed in any of the preceding examples.

Example 80 may include machine-readable storage including machine-readable instructions, when executed, to implement a method as claimed in any preceding example.

Example 81 may include machine-readable storage including machine-readable instructions, when executed, to implement a method or realize an apparatus as claimed in any preceding example.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising memory and processing circuitry configured to:
   determine a physical layer protocol data unit (PPDU) comprising one or more symbols, wherein the PPDU has a first time domain signal periodicity, wherein a symbol of the one or more symbols is associated with pilot subcarriers, and wherein the pilot subcarriers are associated with a contiguous phase;
   cause to append a common preamble to the PPDU, wherein the common preamble comprises a common short training field and a common preamble length field, the common short training field having a second time domain signal periodicity different from the first time domain signal periodicity, and the common preamble length field indicating a length of the PPDU;
   generate a frame, the frame comprising the common preamble and the PPDU, wherein the first time domain signal periodicity indicates a type of PPDU; and
   cause to send the frame.

2. The device of claim 1, wherein a symbol of the one or more symbols comprises a beginning portion and an end portion, wherein the beginning portion has a time duration, wherein the ending portion is based on the time duration, and wherein the beginning portion and the ending portion comprise the same content.

3. The device of claim 1, wherein the type of PPDU is a WiFi PPDU, and wherein the first time domain signal periodicity is 0.8 microseconds or 1.6 microseconds.

4. The device of claim 1, wherein the type of PPDU is a non-WiFi PPDU, and wherein the first time domain signal periodicity is a value other than 0.8 microseconds or 1.6 microseconds.

5. The device of claim 1, wherein the memory and processing circuitry are further configured to map the common short training field based on a bandwidth associated with a frequency spectrum, and wherein to map comprises to apply a sequence [1, 1, 1, 1, 1, 1, 1, −1, −1, −1, 1, −1, 1, 1, −1, −1, −1, 1, 1, −1, 1, −1, −1, 1] to the frequency spectrum.

6. The device of claim 1, wherein the common preamble length field is generated based on a Hadamard code, and wherein the Hadamard code is associated with the length of the PPDU.

7. The device of claim 1, further comprising a transceiver configured to transmit and receive wireless signals.

8. The device of claim 7, further comprising one or more antennas coupled to the transceiver.

9. A non-transitory computer-readable medium storing computer-executable instructions which when executed by one or more processors result in performing operations comprising:
identifying, at a first device, a frame comprising a physical layer protocol data unit (PPDU), a common preamble, and one or more symbols, wherein a symbol of the one or more symbols is associated with pilot subcarriers, and wherein the pilot subcarriers are associated with a contiguous phase;
determining a first time domain signal periodicity associated with a common short training field of the common preamble;
determining a common preamble length field indicating a length of the PPDU, the common preamble comprising the common preamble length field; and
determining a second time domain signal periodicity associated with the PPDU, the second time domain signal periodicity indicating a type of PPDU.

10. The non-transitory computer-readable medium of claim 9, wherein a symbol of the one or more symbols comprises a beginning portion and an end portion, and wherein the operations further comprise determining that the beginning portion and the ending portion comprise the same content.

11. The non-transitory computer-readable medium of claim 9, wherein a symbol of the one or more symbols comprises a beginning portion and an end portion, and wherein the operations further comprise determining that the beginning portion and the ending portion comprise different content.

12. The non-transitory computer-readable medium of claim 9, wherein the type of PPDU is a WiFi PPDU, wherein the second time domain signal periodicity is 0.8 microseconds or 1.6 microseconds, and wherein the operations further comprise determining the one or more symbols.

13. The non-transitory computer-readable medium of claim 9, wherein the type of PPDU is a non-WiFi PPDU, and wherein the second time domain signal periodicity is a value other than 0.8 microseconds or 1.6 microseconds.

14. The non-transitory computer-readable medium of claim 9, wherein the common short training field is mapped based on a bandwidth associated with a frequency spectrum, and wherein to map comprises to apply a sequence [1, 1, 1, 1, 1, 1, −1, −1, −1, 1, −1, 1, 1, −1, −1, −1, 1, 1, −1, 1, −1, −1, −1, 1] to the frequency spectrum.

15. The non-transitory computer-readable medium of claim 9, wherein the common preamble length field is generated based on a Hadamard code, and wherein the Hadamard code is associated with the length of the PPDU.

16. A method comprising:
determining, by one or more processors of a first device, determine a physical layer protocol data unit (PPDU) comprising one or more symbols, wherein the PPDU has a first time domain signal periodicity;
cause to append a common preamble to the PPDU, wherein the common preamble comprises a common short training field and a common preamble length field, the common short training field having a second time domain signal periodicity different from the first time domain signal periodicity, and the common preamble length field indicating a length of the PPDU;
mapping a sequence [1, 1, 1, 1, 1, 1, 1, −1, −1, −1, 1, −1, 1, 1, −1, −1, −1, 1, 1, −1, 1, −1, −1, 1] to a frequency spectrum associated with a bandwidth, the mapping represented by a first sequence {M, 0, −M} if a bandwidth is 40 MHz, a second sequence {−M, −1, M, 0, −M, 1, −M} if the bandwidth is 80 MHz, or by a third sequence {M, 1, −M, 0, −M, 1, −M, −M, −1, M, 0, −M, 1, −M} if the bandwidth is 160 MHz;
generate a frame, the frame comprising the common preamble and the PPDU, wherein the first time domain signal periodicity indicates a type of PPDU; and
causing to send, by the one or more processors, the frame.

17. The method of claim 16, wherein a signal of a pilot subcarrier of the frame is represented $p^t_1 = a_1 \sin(w_1 + \varphi_1) * s_{t,w}$, where p is a pilot tone at a respective time in a time domain, t is the respective time in the time domain, a is an amplitude, w is a respective frequency in a frequency domain, $\varphi$ is a phase, and $s_{t,w}$ is a sequence that depends on the respective time and the respective frequency.

* * * * *